United States Patent
Nishii et al.

(10) Patent No.: US 7,170,600 B2
(45) Date of Patent: Jan. 30, 2007

(54) SPECTROMETER USING DIFFRACTION GRATING

(75) Inventors: Junji Nishii, Ikeda (JP); Tatsuhiro Nakazawa, Ikeda (JP); Shigeo Kittaka, Osaka (JP); Keiji Tsunetomo, Osaka (JP); Kazuaki Oya, Osaka (JP)

(73) Assignees: Nippon Sheet Glass Company, Limited, Osaka (JP); National Institute of Advanced Industrial Science and Technology, Tokyo (JP)

( * ) Notice: Subject to any disclaimer, the term of this patent is extended or adjusted under 35 U.S.C. 154(b) by 139 days.

(21) Appl. No.: 10/528,521

(22) PCT Filed: Sep. 22, 2003

(86) PCT No.: PCT/JP03/12048

§ 371 (c)(1),
(2), (4) Date: Mar. 18, 2005

(87) PCT Pub. No.: WO2004/027493

PCT Pub. Date: Apr. 1, 2004

(65) Prior Publication Data
US 2006/0023212 A1  Feb. 2, 2006

(30) Foreign Application Priority Data
Sep. 20, 2002 (JP) ............................. 2002-275218

(51) Int. Cl.
G01J 3/18 (2006.01)
G02B 6/34 (2006.01)

(52) U.S. Cl. ............................. 356/328; 385/37; 398/87

(58) Field of Classification Search ................ 356/326, 356/328
See application file for complete search history.

(56) References Cited

U.S. PATENT DOCUMENTS
6,084,695 A   7/2000   Martin et al.

FOREIGN PATENT DOCUMENTS

| JP | 56-26706   | 8/1979  |
|----|------------|---------|
| JP | 60-230608  | 11/1985 |
| JP | 1-281411   | 11/1989 |
| JP | 10-300976  | 11/1998 |

OTHER PUBLICATIONS

J. Koyama, et al., "Optical Wave Electronics", Corona Publishing Co., Ltd., Tokyo, 1978, chapter 4, pp. 98-101 and 132 (partial translation).

Primary Examiner—F. L. Evans
(74) Attorney, Agent, or Firm—Hamre, Schumann, Mueller & Larson, P.C.

(57) ABSTRACT

A spectrometer using a diffraction grating includes a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a plurality of focusing lenses that respectively condense the light beams that have been spectrally separated by the diffraction grating.

12 Claims, 10 Drawing Sheets

SPECTROMETER USING DIFFRACTION GRATING

TECHNICAL FIELD

The present invention relates to spectrometers using a diffraction grating, which separate light of different wavelengths.

BACKGROUND ART

In recent years, the rapidly growing popularity of the Internet has caused a strong need for an increased information transmission capacity of optical fiber communication networks, and as a means to this end, the development of wavelength-division multiplexing (WDM) has advanced rapidly. In optical communication by wavelength-division multiplexing, light beams with slight wavelength differences transmit information separately, so that it is necessary to use such optical functional elements as spectral separators, filters and isolators having high wavelength selectivity. What is required of these functional elements is suitability for mass production, compactness, high integration and stability.

Spectrometers are used to separate and detect optical signals in which a plurality of wavelengths are multiplexed intentionally, as in wavelength-division multiplexing. Moreover, spectrometers are used for spectral analysis of measured light, as in spectrometry. Spectrometers are also used in optical disk systems utilizing light sources with a plurality of wavelengths. Such spectrometers require a spectral separation element such as a prism, wavelength filter or diffraction grating or the like.

In particular diffraction gratings are typical spectral separation elements. Diffraction gratings are fabricated for example by forming a periodic blazed microscopic relief structure in a surface of a quartz or silicon substrate, for example. The diffraction light rays generated by this periodic relief structure interfere with each other, so that light of certain specific wavelengths is emitted in specific directions. Since diffraction gratings have such characteristics, they are used as spectral separation elements. Such spectral separation elements have been disclosed in JP H10-300976A, for example.

It is generally known that the wavelength resolving power of diffraction gratings is proportional to the product of the order of the diffraction light and the groove number. What is effective in actual spectral separation elements is the periodicity of the diffraction grating in the range through which the light beam passes. That is to say, in order to improve the resolving power of a diffraction grating, it is necessary to make the diameter of the light beam larger. In order to make the diameter of the light beam larger, the components that are necessary for the optical system accordingly need to be made larger as well.

However, making the optical components, such as the diffraction grating or lenses etc., larger leads to higher costs. Also, as the light beam becomes wide and the lens diameter becomes large, aberrations tend to increase as well, so that means for correcting aberrations need to be provided. Therefore, there is also the problem that spectrometers tend to become large.

Blazed gratings with a sawtooth-shaped cross-sectional shape often are used as diffraction gratings with the purpose of spectral separation. There are reflective and transmissive diffraction gratings having a blazed grating. FIG. 13A is a cross-sectional view showing the configuration of a transmissive diffraction grating 103a having a blazed grating, and FIG. 13B is a cross-sectional view showing the configuration of a reflective diffraction grating 103b having a blazed grating. In the transmissive diffraction grating 103a shown in FIG. 13A, when light 107a of a plurality of wavelengths is incident on the side opposite the side on which the grooves 104a are formed, then a plurality of diffraction light beams 108a and 109a are emitted, which are separated spectrally due to the different directions in which they are emitted from the side on which the grooves 104a are formed.

In the reflective diffraction grating 103b shown in FIG. 13B, when light 107b of a plurality of wavelengths is incident on the side on which the grooves 104b are formed, then it is reflected and a plurality of diffraction light beams 108b and 109b are emitted, which are separated spectrally due to the different directions in which they are reflected from the side on which the grooves 104b are formed. With the reflective diffraction grating 103b, a higher diffraction efficiency can be attained than with the transmissive diffraction grating 103a, so that commonly, the reflective diffraction grating 103b is used. However, with the reflective diffraction grating 103b, it is necessary to process its surface into a reflective surface.

In both the transmissive diffraction grating 103a and the reflective diffraction grating 103b, when the grating period approaches the wavelength of the light, differences in efficiency occur that are dependent upon the polarization direction (TE polarized light or TM polarized light). For this reason, precise design of the blazed shape and a sophisticated machining technology are necessary in order to attain a high diffraction efficiency.

DISCLOSURE OF THE INVENTION

In view of the above-noted problems, it is an object of the present invention to provide a spectrometer that has a high wavelength resolving power that can be made compact.

A spectrometer according to the present invention comprises a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a plurality of focusing lenses that respectively condense the light beams that have been spectrally separated by the diffraction grating. When d is an effective diameter of the collimating lens and the focusing lenses, f is a focal length of the collimating lens and the focusing lenses, D is a physical outer diameter of the collimating lens and the focusing lenses, L is a distance between the diffraction grating and the focusing lenses, φ is an incident angle of the light beam with respect to the diffraction grating when the light beam is incident on the diffraction grating, NA is a numerical aperture of the incident-side optical waveguide, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and $\Delta\psi$ (in radian) is an angular difference of the diffraction angles at the diffraction grating between the light of the wavelength $\lambda_1$ and the light of the wavelength $\lambda_2$, then the following expressions are satisfied. The average wavelength $\lambda_0$ can be expressed as $\lambda_0=(\lambda_1+\lambda_2)/2$.

$$d \geq a$$

$$g_V \geq a/\cos\phi$$

$$g_P \geq a$$

$$L \geq D/\Delta\psi$$

where a is the larger value of $9\lambda_0/(\pi\Delta\psi)$ and $3f\cdot NA$.

Another spectrometer using a diffraction grating according to the present invention comprises a light-incident portion including a planar light source having a uniform light intensity, and a collimating lens that converts a light beam having a plurality of wavelength components emitted from the planar light source into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a plurality of focusing lenses that respectively condense the light beams that have been spectrally separated by the diffraction grating. When d is an effective diameter of the collimating lens and the focusing lenses, f is a focal length of the collimating lens and the focusing lenses, D is a physical outer diameter of the collimating lens and the focusing lenses, L is a distance between the diffraction grating and the focusing lenses, $\phi$ is an incident angle of the light beam with respect to the diffraction grating when the light beam is incident on the diffraction grating, $w_1$ is a radius of the planar light source, NA is a numerical aperture of the planar light source, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and $\Delta\psi$ (in radian) is an angular difference of the diffraction angles at the diffraction grating between the light of the wavelength $\lambda_1$ and the light of the wavelength $\lambda_2$, then the following expressions are satisfied:

$$d \geq 2f\cdot NA$$

$$f \geq 2w_1/\Delta\psi$$

$$g_V \geq 2f\cdot NA/\cos\phi$$

$$g_P \geq 2f\cdot NA$$

$$L \geq D/\Delta\psi$$

Another spectrometer using a diffraction grating comprises a light-incident portion including an incident-side optical waveguide emitting a light beam that includes a plurality of wavelength components and that approximates a Gaussian beam, and a collimating lens that is arranged on an emission side of the incident-side optical waveguide and converts the light beam approximating a Gaussian beam that is emitted from the incident-side optical waveguide into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a single focusing lens that condenses the light beams that have been spectrally separated by the diffraction grating, and a plurality of emission-side optical waveguides that respectively transmit the light beams that have been condensed by the focusing lens. When d is an effective diameter of the collimating lens and the focusing lens, f is a focal length of the collimating lens and the focusing lens, $\phi$ is an incident angle of the light beam with respect to the diffraction grating when the light beam is incident on the diffraction grating, NA is a numerical aperture of the incident-side optical waveguide, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and $\Delta\psi$ (in radian) is an angular difference of the diffraction angles at the diffraction grating between the light of the wavelength $\lambda_1$ and the light of the wavelength $\lambda_2$, then the following expressions are satisfied. The average wavelength $\lambda_0$ can be expressed as $\lambda_0=(\lambda_1+\lambda_2)/2$.

$$d \geq a$$

$$g_V a/\cos\phi$$

$$g_P \geq a$$

$$s=f\cdot\Delta\psi$$

where a is the larger value of $9\lambda_0/(\pi\Delta\psi)$ and $3f\cdot NA$.

Another spectrometer using a diffraction grating comprises a light-incident portion including a planar light source having a uniform light intensity, and a collimating lens that converts a light beam having a plurality of wavelength components emitted from the planar light source into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a single focusing lens that condenses the light beams that have been spectrally separated by the diffraction grating, and a plurality of emission-side optical waveguides that respectively transmit the light beams that have been condensed by the focusing lens. When d is an effective diameter of the collimating lens and the focusing lens, f is a focal length of the collimating lens and the focusing lens, $\phi$ is an incident angle of the light beam with respect to the diffraction grating when the light beam is incident on the diffraction grating, $w_1$ is a radius of the planar light source, NA is a numerical aperture of the planar light source, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and $\Delta\psi$ (in radian)

is an angular difference of the diffraction angles at the diffraction grating between the light of the wavelength $\lambda_1$ and the light of the wavelength $\lambda_2$, then the following expressions are satisfied:

$$d \geq 2f \cdot NA$$

$$f \geq 2w_1/\Delta\psi$$

$$g_V \geq 2f \cdot NA/\cos\phi$$

$$g_P \geq 2f \cdot NA$$

$$s = f \cdot \Delta\psi.$$

Another spectrometer using a diffraction grating comprises a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a plurality of focusing lenses that respectively condense the light beams that have been spectrally separated by the diffraction grating, and emission-side optical waveguides on which the light that has been emitted from the focusing lenses is incident. When d is an effective diameter of the collimating lens and d' is an effective diameter of the focusing lenses, f is a focal length of the collimating lens and f' is a focal length of the focusing lenses, D is a physical outer diameter of the collimating lens and D' is a physical outer diameter of the focusing lenses, L is a distance between the diffraction grating and the focusing lenses, $\phi$ is an incident angle of the light beam with respect to the diffraction grating when the light beam is incident on the diffraction grating, NA is a numerical aperture of the incident-side optical waveguide, NA' is a numerical aperture of the emission-side optical waveguide, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and $\Delta\psi$ (in radian) is an angular difference of the diffraction angles at the diffraction grating between the light of the wavelength $\lambda_1$ and the light of the wavelength $\lambda_2$, then the following expressions are satisfied:

$$d \geq a$$

$$d' \geq a$$

$$g_V \geq a/\cos\phi$$

$$g_P \geq a$$

$$f' = f(NA/NA')$$

$$L \geq D'/\Delta\psi$$

where a is the larger value of $9\lambda_0/(\pi\Delta\psi)$ and $3f \cdot NA$.

Another spectrometer using a diffraction grating comprises a light-incident portion including a planar light source having a uniform light intensity, and a collimating lens that converts a light beam having a plurality of wavelength components emitted from the planar light source into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a plurality of focusing lenses that respectively condense the light beams that have been spectrally separated by the diffraction grating, and emission-side optical waveguides on which the light that has been emitted from the focusing lenses is incident. When d is an effective diameter of the collimating lens and d' is an effective diameter of the focusing lenses, f is a focal length of the collimating lens and f' is a focal length of the focusing lenses, D is a physical outer diameter of the collimating lens and D' is a physical outer diameter of the focusing lenses, L is a distance between the diffraction grating and the focusing lenses, $\phi$ is an incident angle of the light beam with respect to the diffraction grating when the light beam is incident on the diffraction grating, $w_1$ is a radius of the planar light source, NA is a numerical aperture of the planar light source, NA' is a numerical aperture of the emission-side optical waveguide, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and $\Delta\psi$ (in radian) is an angular difference of the diffraction angles at the diffraction grating between the light of the wavelength $\lambda_1$ and the light of the wavelength $\lambda_2$, then the following expressions are satisfied:

$$d \geq 2f \cdot NA$$

$$d' \geq 2f \cdot NA'$$

$$f \geq 2w_1/\Delta\psi$$

$$g_V \geq 2f \cdot NA/\cos\phi$$

$$g_P 2 \geq f \cdot NA$$

$$f' = f(NA/NA')$$

$$L \geq D'/\Delta\psi.$$

Another spectrometer using a diffraction grating comprises a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a single focusing lens that condenses the light beams that have been spectrally separated by the diffraction grating, and a plurality of emission-side optical waveguides that respectively transmit the light beams that have been condensed by the focusing lens. When d is an effective diameter of the collimating lens and d' is an effective diameter of the focusing lens, f is a focal length of the collimating lens and f' is a focal length of the focusing lens, φ is an incident angle of the light beam with respect to the diffraction grating when the light beam is incident on the diffraction grating, NA is a numerical aperture of the incident-side optical waveguide, NA' is a numerical aperture of the emission-side optical waveguide, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and Δψ (in radian) is an angular difference of the diffraction angles at the diffraction grating between the light of the wavelength $\lambda_1$ and the light of the wavelength $\lambda_2$, then the following expressions are satisfied:

$d \geq a$ $d' \geq a$ $g_V \geq a/\cos \phi$ $g_P \geq a$ $f' = f(NA/NA')$ $s = f' \cdot \Delta\psi$ where a is the larger value of $9\lambda_0/(\pi\Delta\psi)$ and $3f \cdot NA$.

Another spectrometer using a diffraction grating comprises a light-incident portion including a planar light source having a uniform light intensity, and a collimating lens that converts a light beam having a plurality of wavelength components emitted from the planar light source into a substantially collimated light beam; a diffraction grating having grooves on its surface, on which the light beam that has been converted into the substantially collimated light beam by the collimating lens is incident, the diffraction grating spectrally separating the light beam by emitting light beams whose emission direction depends on their wavelength; and a light-emitting portion having a single focusing lens that condenses the light beams that have been spectrally separated by the diffraction grating, and a plurality of emission-side optical waveguides that respectively transmit the light beams that have been condensed by the focusing lens. When d is an effective diameter of the collimating lens and d' is an effective diameter of the focusing lens, f is a focal length of the collimating lens and f' is a focal length of the focusing lens, φ is an incident angle of the light beam with respect to the diffraction grating when the light beam is incident on the diffraction grating, $w_1$ is a radius of the planar light source, NA is a numerical aperture of the planar light source, NA' is a numerical aperture of the emission-side optical waveguide, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and Δψ (in radian) is an angular difference of the diffraction angles at the diffraction grating between the light of the wavelength $\lambda_1$ and the light of the wavelength $\lambda_2$, then the following expressions are satisfied:

$d \geq 2f \cdot NA$ $d' \geq 2f' \cdot NA'$ $f \geq 2w_1/\Delta\psi$ $f' = f(NA/NA')$ $g_V \geq 2f \cdot NA/\cos \phi$ $g_P \geq 2f \cdot NA$ $s = f' \Delta\psi$.

BEST MODE FOR CARRYING OUT THE INVENTION

Figure 1:
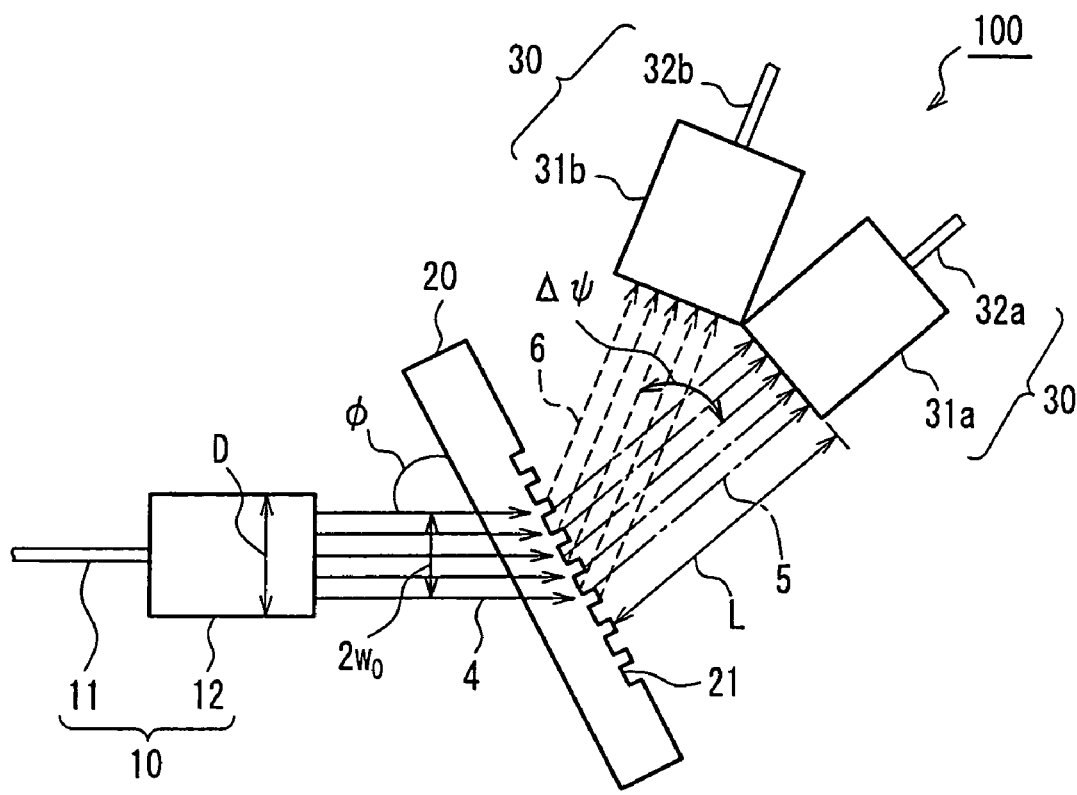
FIG. 1 is a schematic diagram showing the configuration of a spectrometer using a diffraction grating according to Embodiment 1 of the present invention.

In the spectrometer using a diffraction grating according to an embodiment of the present invention, a light beam that can be regarded as a Gaussian beam, such as the light emitted from a single-mode optical fiber, is incident on a diffraction grating, and light beams that are spectrally separated by the diffraction grating are respectively condensed by individual focusing lenses. When the adjacent wavelengths to be separated as well as the resolving power of the diffraction grating following therefrom are given, then a wavelength separation with high efficiency and little polarization dependency is possible and the spectrometer can be made compact.

In the spectrometer using a diffraction grating according to another embodiment of the present invention, a light beam emitted from a light source that can be regarded as a planar light source, obtained by aggregating a plurality of point light sources, such as the end face of a multi-mode optical fiber, is incident on a diffraction grating, and light beams that are spectrally separated by the diffraction grating are respectively condensed by individual focusing lenses. When the adjacent wavelengths to be separated as well as the resolving power of the diffraction grating following therefrom are given, then a wavelength separation with high efficiency and little polarization dependency is possible and the spectrometer can be made compact.

In the spectrometer using a diffraction grating according to another embodiment of the present invention, a light beam that can be regarded as a Gaussian beam, such as the light emitted from a single-mode optical fiber, is incident on a diffraction grating, and light beams that are spectrally separated by the diffraction grating are condensed by the same focusing lens. When the adjacent wavelengths to be separated as well as the resolving power of the diffraction grating following therefrom are given, then a wavelength separation with high efficiency and little polarization dependency is possible and the spectrometer can be made compact.

In the spectrometer using a diffraction grating according to another embodiment of the present invention, a light beam emitted from a light source that can be regarded as a planar light source, obtained by aggregating a plurality of point light sources, such as the end face of a multi-mode optical fiber, is incident on a diffraction grating, and light beams that are spectrally separated by the diffraction grating are condensed by the same focusing lens. When the adjacent wavelengths to be separated as well as the resolving power of the diffraction grating following therefrom are given, then a wavelength separation with high efficiency and little polarization dependency is possible and the spectrometer can be made compact.

In the spectrometer using a diffraction grating according to another embodiment of the present invention, the collimating lens and the focusing lenses are different, a light beam that can be regarded as a Gaussian beam, such as the light emitted from a single-mode optical fiber, is incident on a diffraction grating, and light beams that are spectrally separated by the diffraction grating respectively are condensed by individual focusing lenses. When the adjacent wavelengths to be separated as well as the resolving power of the diffraction grating following therefrom are given, then a wavelength separation with high efficiency and little polarization dependency is possible and the spectrometer can be made compact.

In the spectrometer using a diffraction grating according to another embodiment of the present invention, the collimating lens and the focusing lenses are different, a light beam emitted from a light source that can be regarded as a planar light source, obtained by aggregating a plurality of point light sources, such as the end face of a multi-mode optical fiber, is incident on a diffraction grating, and light beams that are spectrally separated by the diffraction grating respectively are condensed by individual focusing lenses. When the adjacent wavelengths to be separated as well as the resolving power of the diffraction grating following therefrom are given, then a wavelength separation with high efficiency and little polarization dependency is possible and the spectrometer can be made compact.

In the spectrometer using a diffraction grating according to another embodiment of the present invention, the collimating lens and the focusing lens are different, a light beam that can be regarded as a Gaussian beam, such as the light emitted from a single-mode optical fiber, is incident on a diffraction grating, and light beams that are spectrally separated by the diffraction grating are condensed by the same focusing lens. When the adjacent wavelengths to be separated as well as the resolving power of the diffraction grating following therefrom are given, then a wavelength separation with high efficiency and little polarization dependency is possible and the spectrometer can be made compact.

In the spectrometer using a diffraction grating according to another embodiment of the present invention, the collimating lens and the focusing lens are different, a light beam emitted from a light source that can be regarded as a planar light source, obtained by aggregating a plurality of point light sources, such as the end face of a multi-mode optical fiber, is incident on a diffraction grating, and light beams that are spectrally separated by the diffraction grating are condensed by the same focusing lens. When the adjacent wavelengths to be separated as well as the resolving power of the diffraction grating following therefrom are given, then a wavelength separation with high efficiency and little polarization dependency is possible and the spectrometer can be made compact.

It is preferable that the diffraction grating's surface on which the light beam is incident is substantially rectangular or substantially elliptical. Thus, the proportion of the effective surface of the diffraction grating can be increased. That is to say, in the diffraction grating, the surface area of the portion on which no light is incident can be made small. Therefore, the diffraction grating can be fabricated at low cost.

It is preferable that the collimating lens and the focusing lenses are rod lenses having a refractive index distribution along their radial direction. Thus, when coupling the rod lenses to the optical fibers, centering during assembly is easy, since rod lenses have good matching properties to optical fibers due to their shape.

Furthermore, it is preferable that the diffraction grating is a substrate having grooves of parallel relief in its surface, the groove's vertical cross-sectional shape being substantially rectangular. Thus, the grooves can be fabricated with high precision, and a diffraction grating with high diffraction efficiency can be attained.

Furthermore, it is preferable that the diffraction grating is a two-dimensional photonic crystal having grooves of parallel relief in its surface, the groove's vertical cross-sectional shape being substantially rectangular. Thus, a diffraction grating with high diffraction efficiency can be attained.

The following is a detailed explanation of embodiments of the present invention.

Embodiment 1

A spectrometer using a diffraction grating according to Embodiment 1 of the present invention is explained using FIG. 1. FIG. 1 is a diagram showing the configuration of a spectrometer 100 according to Embodiment 1 of the present invention. The spectrometer 100 of Embodiment 1 comprises a light-incident portion 10, a diffraction grating 20 and a light-emitting portion 30.

The light-incident portion 10 has an optical fiber 11, which is an incident-side optical waveguide, and a collimating lens 12, which converts a light beam into a substantially collimated light beam. The optical fiber 11 is a single-mode fiber (this includes polarization preserving fibers), and its numerical aperture is NA. The optical fiber 11 transmits light beams that include a plurality of wavelength components and approximate Gaussian beams. It should be noted that the NA is defined by the far field spread angle at which the intensity of the Gaussian beam is $1/e^2$ of that at the center.

The collimating lens 12 is arranged on the emission side of the optical fiber 11. The light beam transmitted in the optical fiber 11 emerge from the optical fiber 11, is incident on the collimating lens 12, and is converted into a substantially collimated light beam.

The light beam emitted from the end face of the optical fiber 11 can be regarded as a Gaussian beam, has a large spread angle, and includes a plurality of wavelength components. With the collimating lens 12, this light beam is converted into a Gaussian light beam 4 with a small spread angle and a large beam width.

It is desirable that the shape of the diffraction grating 20 on the side on which the light beam 4 is incident is substantially rectangular or substantially elliptical. Grooves 21 are formed on its surface, and incident light beams are separated spectrally by changing the emission directions depending on the wavelength of each light beam. The Gaussian light beam 4 that is emitted from the collimating lens 12 is incident on the diffraction grating 20, and is spectrally separated according to its wavelength components into a light beam 5 and a light beam 6 of different directions.

The following is an explanation of the reason why it is preferable that the shape of the diffraction grating 20 is substantially rectangular or substantially elliptical. If the light beam 4 is a circular beam, and if the light beam 4 is perpendicularly incident on the diffraction grating 20, then the light beam 4 on the incident surface of the diffraction grating 20 is circular. If the light beam 4 is not perpendicularly incident on the diffraction grating 20, then the light beam 4 takes on an elliptical shape on the incident surface of the diffraction grating 20. Consequently, when the shape of the diffraction grating 20 is substantially elliptical, then there are fewer wasted locations on which the light beam 4 is not incident, so that the diffraction grating 20 can be fabricated with lower cost. It should be noted that also when side of the diffraction grating 20 on which the light beam 4 is incident is substantially rectangular, then there are few wasted locations, so that the diffraction grating 20 can be manufactured at low cost.

The light-emitting portion 30 includes focusing lenses 31a and 31b and emission-side optical fibers 32a and 32b. The focusing lenses 31a and 31b and the emission-side fibers 32a and 32b are provided at a number corresponding to the number of light beams that are spectrally separated by the diffraction grating 20. In Embodiment 1, two light beams 5 and 6 are separated, so that the focusing lenses 31a and 31b are provided. The light beams 5 and 6 are respectively condensed by the focusing lenses 31a and 31b and coupled into the emission-side optical fibers 32a and 32b, respectively.

The wavelength of the light beam 5 is $\lambda_1$ and the wavelength of the light beam 6 is $\lambda_2$. The light beam 4 incident on the diffraction grating 20 is light in which the light beam 5 and the light beam 6 are mixed together. In this situation, the wavelengths of the adjacent incident light beams are $\lambda_1$ and $\lambda_2$, and the average wavelength $\lambda_0$ of these adjacent incident light beams can be expressed as:

$$\lambda_0 = (\lambda_1 + \lambda_2)/2$$

Moreover, the difference between the diffraction angles of the light beam 5 and the light beam 6 that are separated by diffraction at the diffraction grating 20 is $\Delta\psi$ (measured in radian).

The collimating lens 12 and the focusing lenses 31a and 31b are graded-index rod lenses having the same focal length and size, and their effective diameter is d whereas their physical outer diameter is D. Moreover, the distance between the diffraction grating 20 and the focusing lenses 31a and 31b is L.

The beam waist radius of the light beam 4 that is emitted from the collimating lens 12 toward the diffraction grating 20 is $w_0$. Since the light beam 4 is a Gaussian beam, this radius depends, strictly speaking, on its position. However, the beam waist radius $w_0$ is sufficiently large, and the radius of the light beams 4, 5 and 6 from the collimating lens 12 to the focusing lenses 31a and 31b (i.e. the radius at which the light intensity of the Gaussian beam becomes $1/e^2$ of that at the optical axis) can be regarded as a constant value that is equivalent to the beam waist radius $w_0$.

The spread angle $\theta_0$ at the far field of the light beam 4, whose beam waist radius is $w_0$, can be expressed by the following equation:

$$\tan\theta_0 = \lambda_0/(\pi w_0)$$

However, since $\theta_0$ is a very small angle, this can be rewritten as:

$$\theta_0 = \lambda_0/(\pi w_0) \qquad (1).$$

The angular difference of the diffraction angles for the light beams 5 and 6 of the wavelengths $\lambda_1$ and $\lambda_2$ is $\Delta\psi$, so that in order to clearly separate the light beam 5 with the wavelength $\lambda_1$ from the light beam 6 with the wavelength $\lambda_2$, it is desirable that:

$$\Delta\psi \geq 3\theta_0 \qquad (2).$$

From Expressions (1) and (2), the relationship $$w_0 \geq 3\lambda_0/(\pi\Delta\psi) \qquad (3)$$

can be obtained.

Figure 2:
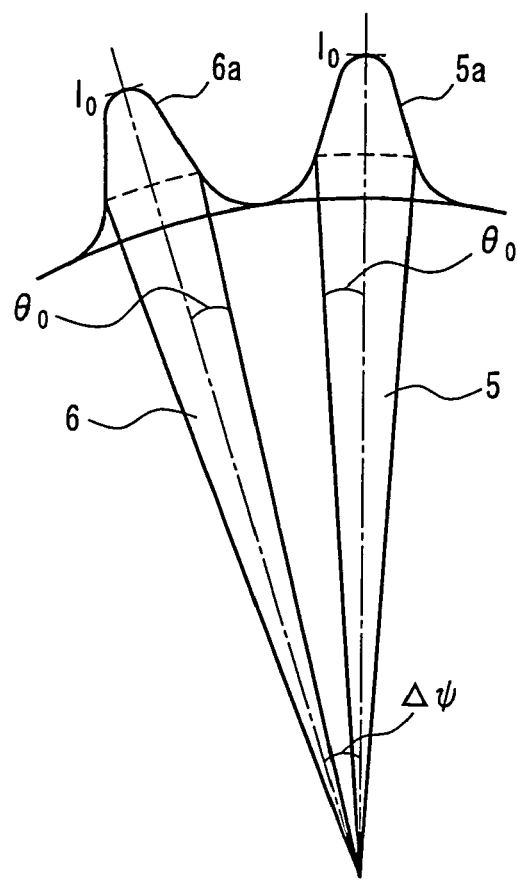
FIG. 2 is a schematic diagram showing the relation of the light beams for the case that $\Delta\psi \geq 3\theta_0$.
Figure 3:
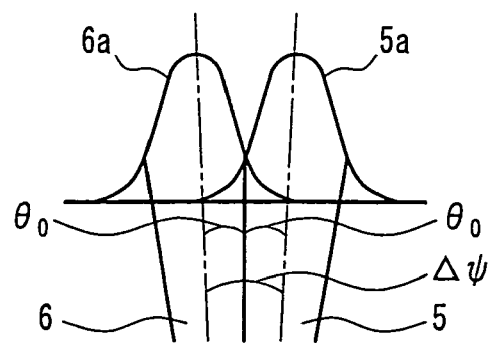
FIG. 3 is a schematic diagram showing the relation of the light beams for the case that $\Delta\psi = 2\theta_0$.

The reason why the condition of Expression (2) is necessary is explained with reference to FIG. 2 and FIG. 3. FIG. 2 is a schematic diagram showing the relationship of the light beams 5 and 6 for the case that $\Delta\psi \geq 3\theta_0$. FIG. 3 is a schematic diagram showing the relationship of the light beams 5 and 6 for the case that $\Delta\psi = 2\theta_0$. In FIG. 2, the light beam 5 and the light beam 6 have an angular difference $\Delta\psi$ for the spread angle $\theta_0$. As can be seen from the Gaussian distribution 5a and the Gaussian distribution 6a of the light beam 5 and the light beam 6, $\theta_0$ is the angle that is defined by the location with a value of 13.5% of the maximum power $I_0$ of the light beams 5 and 6 and the respective center axes of the light beams 5 and 6. As can be seen in FIG. 2, in which $\Delta\psi \geq 3\theta_0$, the Gaussian distributions 5a and 6a do not overlap, so that the light beam 5 and the light beam 6 are clearly separated.

On the other hand, in FIG. 3, in which $\Delta\psi \geq 3\theta_0$ does not hold, but $\Delta\psi = 2\theta_0$, there is a location at which the Gaussian distributions 5a and 6a overlap. Therefore, the light beam 5 and the light beam 6 are not clearly separated.

As described above, the condition $\Delta\psi \geq 3\theta_0$ (Expression (2)) is necessary in order to clearly separate the light beam 5 of wavelength $\lambda_1$ and the light beam 6 of wavelength $\lambda_2$.

On the other hand, with regard to the beam waist radius $w_0$, in order to make the vignetting of the light beams sufficiently small, the effective diameter d of the collimating lens 12 and the focusing lenses 31a and 31b needs to be at least $3w_0$. Furthermore, if the light beam 4 is perpendicularly incident on the diffraction grating 20, then the light beam 4 is circular at the incident surface of the diffraction grating 20, as mentioned above. Consequently, in order to let all of the light beam 4 be incident on the diffraction grating 20, the length $g_P$ of the diffraction grating 20 in the direction parallel to the grooves 21 (in the direction perpendicular to the paper plane in FIG. 1) and the length $g_V$ of the diffraction grating 20 in the direction vertical to the grooves 21 (in the direction parallel to the paper plane in FIG. 1 and along the surface of the diffraction grating 20 on the side on which the light beam 4 is incident) both need to be at least $3W_0$. Here, the smaller one of the lengths $g_P$ and $g_V$ of the diffraction grating 20 is denoted as $G_0$. That is to say, the length $g_P$ of the diffraction grating 20 along the direction parallel to the grooves 21 and the length $g_V$ of the diffraction grating 20 along the direction vertical to the grooves 21 are both at least $G_0$.

As noted above, the reason why the effective diameter d and the lengths $g_P$ and $g_V$ of the diffraction grating 20 are set to at least $3W_0$ is because the actual spread of the Gaussian beam is wider than the beam waist radius $w_0$. That is to say, in order to use all of the energy of the light beam 4, the effective diameter d and the lengths $g_P$ and $g_V$ of the diffraction grating 20 need to be at least $3W_0$, as noted above.

Consequently, the following expressions can be obtained from Expression (3):

$$d \geq 9\lambda_0/(\pi\Delta\psi) \tag{4}$$

$$G_0 \geq 9\lambda_0/(\pi\Delta\psi) \tag{5}$$

Now, expressed in terms of the numerical aperture NA of the optical fiber 11 and the focal length f of the collimating lens 12 and the focusing lenses 31a and 31b, the effective diameter d of the collimating lens 12 should be $$d = 3f \cdot NA \tag{6}$$

in order to capture the Gaussian light beam 4 emerging from the optical fiber 11 with little loss. It should be noted that when the radius of the collimating lens 12 is set to f·NA, that is, when the diameter of the collimating lens 12 is set to 2f·NA, then a portion of the light on the outer side of the light beam 4 cannot be captured and losses occur.

Consequently, in accordance with Expressions (4), (5) and (6), the minimally necessary effective lens diameter and size of the diffraction grating become:

$$d \geq a$$

$$G_0 \geq a.$$

If $$3f \cdot NA > 9\lambda_0/(\pi\Delta\psi)$$

then a should be set to $$a = 3f \cdot NA.$$

In this case, there is no loss of light and also the spectral resolution is preserved. However, when $$3f \cdot NA < 9\lambda_0/(\pi\Delta\psi)$$

then even though there may be no loss of light, the light beams become narrower than $9\lambda_0/(\pi\Delta\psi)$, so that the spectral resolution becomes poor. Accordingly, under the premise that the relation $$3f \cdot NA \geq 9\lambda_0/(\pi\Delta\psi)$$

is satisfied, the value of a is set to $$a = 3f \cdot NA.$$

It should be noted, however, that the above expressions correspond to the case that the incident light beam 4 is perpendicularly incident on the diffraction grating 20.

If the light beam is not perpendicularly incident on the diffraction grating 20 as shown in FIG. 1, then the length of the light beam 4 in the direction parallel to the grooves 21 in the incident surface of the diffraction grating 20 does not change. However, the length of the light beam 4 in the direction perpendicular to the grooves 21 in the incident surface of the diffraction grating 20 becomes longer. That is to say, the length $g_V$ of the diffraction grating 20 in the direction perpendicular to the grooves 21 (the direction parallel to the paper plane of FIG. 1, on the side of the diffraction grating 20 on which the light beam 4 is incident) needs to satisfy the following condition:

$$g_V \geq G_0/\cos\phi$$

Furthermore, the length $g_P$ of the diffraction grating 20 in the direction parallel to the grooves 21 (the direction perpendicular to the paper plane of FIG. 1) is equal to $G_0$, so that:

$$g_P \geq a.$$

Thus, all of the light beam 4 can be incident on the diffraction grating 20. Therefore, loss does not occur.

In order to let the light beams 5 and 6 that have been spectrally separated by the diffraction grating 20 be respectively incident on the focusing lenses 31a and 31b, the interval between the light beams 5 and 6 needs to be at least the physical outer diameter D of the focusing lenses 31a and 31b. That is to say, the interval between the light beams 5 and 6 can be expressed in terms of the distance L between the diffraction grating 20 and the focusing lenses 31a and 31b, and is at least the physical outer diameter D, so that the following relationship is given:

$$L \cdot \tan \Delta\psi \geq D.$$

Since the angular difference $\Delta\psi$ of the diffraction angles is a very small angle, the relationship $$L \geq D/\Delta\psi$$

holds. Thus, the minimum value for L can be obtained.

From the above results, it is possible to determine the minimum size of each member of as well as of the overall spectrometer 100, if a single-mode fiber 11 is used for the light-incident portion 10, that is, if the incident light beam 4 is regarded as a Gaussian beam and the average wavelength $\lambda_0$ and the angular difference $\Delta\psi$ of the diffraction angles are known. This is shown in the following.

(a) The minimum value of the effective diameter d of the collimating lens 12 and the focusing lenses 31a and 31b is the larger value of $9\lambda_0/(\pi\Delta\psi)$ and 3f·NA. If the focal lengths f of the collimating lens 12 and the focusing lenses 31a and 31b can be selected freely, and if both are set to the same value, then the focal length f should be set to $$f=3\lambda_0/(\pi\Delta\psi\cdot NA).$$

(b) The minimum value of the size of the diffraction grating 20 (which is taken to be substantially rectangular or substantially elliptical) is as follows:

The length $g_V$ of the diffraction grating 20 in the direction vertical to the grooves 21 is a/cos φ. The length $g_P$ of the diffraction grating 20 in the direction vertical to the grooves 21 is a.

(c) The minimum value of the distance L between the diffraction grating 20 and the focusing lenses 31a and 31b is D/Δψ.

(d) There is no limitation to the interval between the collimating lens 12 and the diffraction grating 20. Consequently, it should be as short as possible.

(e) The minimum value of the physical outer diameter D of the collimating lens 12 and the focusing lenses 31a and 31b should be the same as the effective diameter d of the collimating lens 12 and the focusing lenses 31a and 31b.

By satisfying the above conditions, the spectrometer 100 using the diffraction grating of Embodiment 1 is capable of wavelength separation with high efficiency and with little polarization dependency, and can be minimized.

The foregoing explanations were for conditions for minimizing the spectrometer 100 for the case that the collimating lens 12 and the focusing lenses 31a and 31b have the same focal length and size. If the numerical aperture of the optical fiber 11 on the incident side is different from the numerical aperture of the optical fibers 32a and 32b on the emission side, then the collimating lens 12 and the focusing lenses 31a and 31b need to be different. Referring to FIG. 1, the conditions for minimizing the spectrometer 100 are explained in the following for the case that the collimating lens 12 is different from the focusing lenses 31a and 31b. The numerical aperture of the optical fiber 11 is taken to be NA, as in the above-described case, whereas the numerical aperture of the optical fibers 32a and 32b on the emission side is taken to be NA'. In this case, the collimating lens 12 is similar to the above-described case. The effective diameter of the collimating lens 12 is d, its focal length is f, and its physical diameter is D. The focusing lenses 31a and 31b are different from the above-described case. The effective diameter of the focusing lenses 31a and 31b is d', their focal length is f', and their physical diameter is D'. In this case, the conditions for minimizing the spectrometer 100 are as follows:

(a) The minimum value of the effective diameter d of the collimating lens 12 is the larger value of $9\lambda_0/(\pi\Delta\psi)$ and 3f·NA. Also the minimum value of the effective diameter d' of the focusing lenses 31a and 31b is the larger value of $9\lambda_0/(\pi\Delta\psi)$ and 3f·NA. It is preferable that the focal length f' of the focusing lenses 31a and 31b corresponds to the focal length f of the collimating lens 12 on the incident side, so that:

$$f\cdot NA=f'\cdot NA'$$

and thus f' should be set to $$f'=f(NA/NA').$$

(b) The minimum value of the size of the diffraction grating 20 (which is taken to be substantially rectangular or substantially elliptical) is as follows:

The length $g_V$ of the diffraction grating 20 in the direction vertical to the grooves 21 is a/cos φ. The length $g_P$ of the diffraction grating 20 in the direction parallel to the grooves 21 is a.

(c) Using the physical outer diameter D' of the focusing lenses 31a and 31b, the minimum value of the distance L between the diffraction grating 20 and the focusing lenses 31a and 31b becomes D'/Δψ.

(d) There is no limitation to the interval between the collimating lens 12 and the diffraction grating 20. Consequently, it should be as short as possible.

(e) The minimum value of the physical outer diameter D of the collimating lens 12 is the same as the effective diameter d of the collimating lens 12. Also, the minimum value of the physical outer diameter D' of the focusing lenses 31a and 31b should be the same as the effective diameter d' of the focusing lenses 31a and 31b.

By satisfying the above conditions, the spectrometer 100, which is capable of wavelength separation with high efficiency and with little polarization dependency, can be minimized in size when the collimating lens 12 and the focusing lenses 31a and 31b are different.

Embodiment 2

Figure 4:
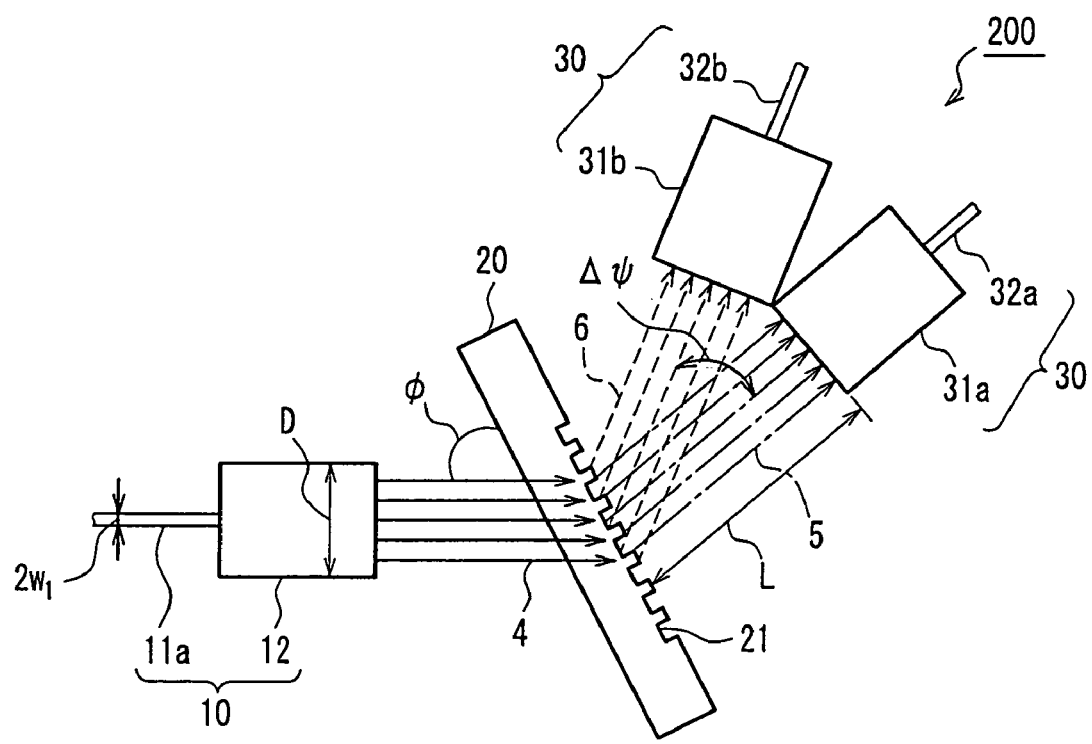
FIG. 4 is a schematic diagram showing the configuration of a spectrometer using a diffraction grating according to Embodiment 2 of the present invention.

A spectrometer 200 using a diffraction grating 20 according to Embodiment 2 of the present invention is explained with reference to FIG. 4. FIG. 4 is a schematic diagram showing the configuration of the spectrometer 200 according to Embodiment 2 of the present invention. The spectrometer 200 of Embodiment 2 differs from the spectrometer 100 of Embodiment 1 with regard to the fact that it uses an optical fiber 11a that is a multi-mode fiber, instead of the single-mode optical fiber 11, but the remaining configuration is the same. Thus, identical members are denoted by identical numerals, and their further explanation has been omitted.

Since the optical fiber 11a at the light-incident portion 10 of Embodiment 2 is a multi-mode fiber, the light that is transmitted through and emitted from the optical fiber 11a can be regarded as light emitted from a planar light source (optical fiber 11a) having a uniform optical intensity. The conditions for minimization of the spectrometer 200 for this case are as follows.

When $w_1$ is the core radius of the optical fiber 11a (that is the size of the planar light source), NA is the numerical aperture of the optical fiber 11a serving as the planar light source, and f is the focal length of the collimating lens 12 and the focusing lenses 31a and 31b, which are lenses of identical shape, then the spread angle $\theta_1$ (half angle) of the collimated light beam 4 can be expressed by the following expression:

$$\tan\theta_1=w_1/f.$$

However, since $\theta_1$ is a very small angle, this can be rewritten as:

$$\theta_1=w_1/f \qquad (7).$$

The angular difference of the diffraction angles for the light beams 5 and 6 of the wavelengths $\lambda_1$ and $\lambda_2$ is Δψ, so that in order to clearly separate the light beam 5 with the wavelength $\lambda_1$ from the light beam 6 with the wavelength $\lambda_2$, it is desirable that:

$$\Delta\psi\geq 2\theta_1 \qquad (8).$$

From Expressions (7) and (8), the relation $$\Delta\psi\geq 2w_1/f$$

can be obtained, and the focal length f of the collimating lens 12 and the focusing lenses 31a and 31b has to satisfy the condition $$f \geq 2w_1/\Delta\psi \qquad (9)$$

The effective diameter d of the collimating lens 12 and the focusing lenses 31a and 31b, the length $g_P$ of the diffraction grating 20 in the direction parallel to the grooves 21 (the direction perpendicular to the paper plane in FIG. 4) and the length $g_V$ of the diffraction grating 20 in the direction vertical to the grooves 21 (the direction parallel to the paper plane in FIG. 4 and along the surface on the side on which the light beam 4 is incident on the diffraction grating 20) has to be at least as large as the diameter of the light beam 4. Here, the smaller value of the length $g_P$ and the length $g_V$ of the diffraction grating 20 is taken to be $G_0$. The radius of the light beam in this case can be expressed by f·NA, so that $$d \geq 2f \cdot NA \qquad (10)$$

$$G_0 \geq 2f \cdot NA \qquad (11)$$

can be obtained, and thus the minimum value of the effective diameter d of the collimating lens 12 and the lengths $g_P$ and $g_V$ of the diffraction grating 20 are known. It should be noted, however, that the above Expression (11) corresponds to the case when the light beam 4 is perpendicularly incident on the diffraction grating 20. If the light beam 4 is incident on the diffraction grating 20 at an incidence angle φ, then the length $g_V$ of the diffraction grating 20 can be expressed as $$g_V \geq G_0/\cos\phi.$$

The condition that L, which is the distance between the diffraction grating 20 and the focusing lenses 31a and 31b, should satisfy is the same as in the case of Embodiment 1, namely:

$$L \cdot \tan\Delta\psi \geq D$$

Here, Δψ is a very small angle, so that the condition that L should satisfy is $$L \geq D/\Delta\psi.$$

From the above results, it is possible to determine the minimum size of each member of as well as of the overall spectrometer 200, if a multi-mode fiber 11a is used for the light-incident portion 10, that is, if the incident light beam 4 is regarded as light emitted from a planar light source (optical fiber 11a) having a uniform light intensity, and the average wavelength $\lambda_0$ and the angular difference Δψ are known. This is shown in the following.

(a) The minimum value of the effective diameter d of the collimating lens 12 and the focusing lenses 31a and 31b is 2f·NA.

(b) The minimum value of the focal length f of the collimating lens 12 and the focusing lenses 31a and 31b is $2w_1/\Delta\psi$.

(c) The minimum value of the size of the diffraction grating 20 (which is taken to be substantially rectangular or substantially elliptical) is as follows:

The length $g_V$ of the diffraction grating 20 in the direction vertical to the grooves 21 is 2f·NA/cos φ. The length $g_P$ of the diffraction grating 20 in the direction parallel to the grooves 21 is 2f·NA.

(d) The minimum value of the distance L between the diffraction grating 20 and the focusing lenses 31a and 31b is D/Δψ.

(e) There is no limitation to the interval between the collimating lens 12 and the diffraction grating 20. Consequently, it should be as short as possible.

(f) The minimum value of the physical outer diameter D of the collimating lens 12 and the focusing lenses 31a and 31b should be the same as the effective diameter d of the collimating lens 12 and the focusing lenses 31a and 31b.

By satisfying the above conditions, the spectrometer using the diffraction grating of Embodiment 2 is capable of wavelength separation with high efficiency and with little polarization dependency, and can be minimized.

The foregoing explanations were for conditions for minimizing the spectrometer 200 for the case that the collimating lens 12 and the focusing lenses 31a and 31b have the same focal length and size. If the numerical aperture of the optical fiber 11a on the incident side is different from the numerical aperture of the optical fibers 32a and 32b on the emission side, then the collimating lens 12 and the focusing lenses 31a and 31b need to be different. Referring to FIG. 4, the conditions for minimizing the spectrometer 200 are explained in the following for the case that the collimating lens 12 is different from the focusing lenses 31a and 31b. The numerical aperture of the optical fiber 11a is taken to be NA, as in the above-described case, whereas the numerical aperture of the optical fibers 32a and 32b on the emission side is taken to be NA'. In this case, the collimating lens 12 is similar to the above-described case. The effective diameter of the collimating lens 12 is d, its focal length is f, and its physical diameter is D. The focusing lenses 31a and 31b are different from the above-described case. The effective diameter of the focusing lenses 31a and 31b is d', their focal length is f', and their physical diameter is D'. In this case, the conditions for minimizing the spectrometer 200 are as follows:

(a) The minimum value of the effective diameter d of the collimating lens 12 is 2f·NA. Furthermore, the minimum value of the effective diameter d' of the focusing lenses 31a and 31b is 2f·NA'.

(b) The minimum value of the focal length f of the collimating lens 12 is $2w_1/\Delta\psi$. Furthermore, the minimum value of the focal length f' of the focusing lenses 31a and 31b is f(NA/NA').

(c) The minimum value of the size of the diffraction grating 20 (which is taken to be substantially rectangular or substantially elliptical) is as follows:

The length $g_V$ of the diffraction grating 20 in the direction vertical to the grooves 21 is 2f·NA/cos φ. The length $g_P$ of the diffraction grating 20 in the direction parallel to the grooves 21 is 2f·NA.

(d) Using the physical outer diameter D' of the focusing lenses 31a and 31b, the minimum value of the distance L between the diffraction grating and the focusing lenses 31a and 31b is D'/Δψ.

(e) There is no limitation to the interval between the collimating lens 12 and the diffraction grating 20. Consequently, it should be as short as possible.

(f) The minimum value of the physical outer diameter D of the collimating lens 12 is the same as the effective diameter d of the collimating lens 12. Furthermore, the physical outer diameter D' of the focusing lenses 31a and 31b should be the same as the effective diameter d' of the focusing lens 31a and 31b.

By satisfying the above conditions, the spectrometer 200, which is capable of wavelength separation with high efficiency and with little polarization dependency, can be minimized in size when the collimating lens 12 and the focusing lenses 31a and 31b are different.

Embodiment 3

Figure 5:
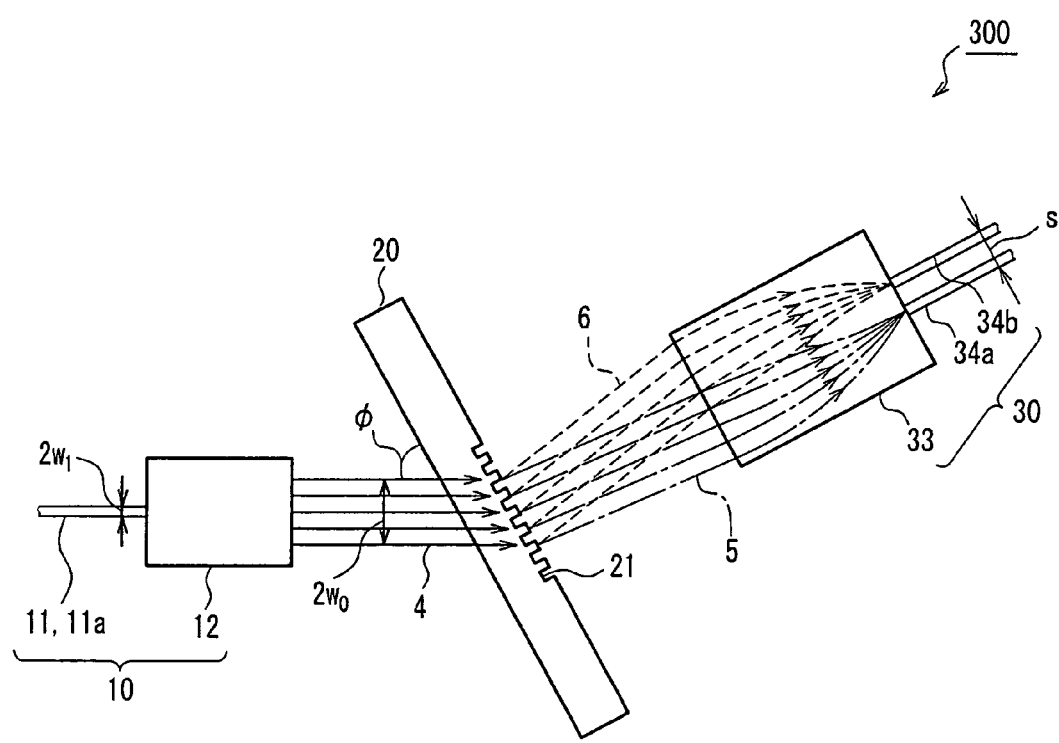
FIG. 5 is a schematic diagram showing the configuration of a spectrometer using a diffraction grating according to Embodiment 3 of the present invention.

A spectrometer 300 using a diffraction grating according to Embodiment 3 of the present invention is explained with reference to FIG. 5. FIG. 5 is a schematic diagram showing the configuration of the spectrometer 300 according to Embodiment 3 of the present invention. The spectrometer 300 of Embodiment 3 differs from the spectrometer 100 of Embodiment 1 with regard to the fact that only one focusing lens 33 used for all of the light beams of different wavelengths is provided. Emission-side optical fibers 34a and 34b are arranged at the outgoing end of the focusing lens 33. The spectrometer 300 of Embodiment 3 uses either the single-mode optical fiber 11 shown in Embodiment 1 or the multi-mode optical fiber 11a shown in Embodiment 2. The remaining configuration of the spectrometer 300 of Embodiment 3 is substantially the same as that of the spectrometer 100 of Embodiment 1. Therefore, identical members are denoted by identical numerals, and their further explanation has been omitted.

In the spectrometer 300 of Embodiment 3, after spectral separation with the diffraction grating 20 by changing the emission direction for each of the light beams of different wavelength, the spectrally separated light beams 5 and 6 are both incident on the focusing lens 33. After the light beams 5 and 6 are incident on the focusing lens 33, they are respectively coupled into the emission-side optical fibers 34a and 34b, which are arranged next to one another at the outgoing end of the focusing lens 33. It should be noted that the collimating lens 12 and the focusing lens 33 are lenses of the same shape, whose focal length is f, whose effective diameter is d and whose physical diameter is D.

First, the minimum values of the spectrometer 300 according to Embodiment 3 are explained for the case that the light-incident portion 10 includes a single-mode optical fiber 11. It should be noted that the optical fiber 11 is a single-mode fiber (this includes polarization preserving fibers) and its numerical aperture is NA. However, the NA is defined by the far field spread angle at which the intensity of the Gaussian beam is $1/e^2$ of that at the center.

Regarding the conditions for the minimum values of the spectrometer 300 of Embodiment 3, the conditions (a) and (b) can be determined in a similar manner to that described in Embodiment 1. More specifically, the following conditions are necessary.

First, the minimum value of the effective diameter d of the collimating lens 12 and the focusing lens 33, which are lenses of the same shape, is the larger of the values $9\lambda_0/(\pi\Delta\psi)$ and 3f·NA. If the focal length f of the collimating lens 12 and the focusing lens 33 can be selected freely, and if both are set to the same value, then the focal length f should be set to $$f = 3\lambda_0/(\pi\Delta\psi \cdot NA).$$

Furthermore, the minimum value of the size of the diffraction grating 20 (which is taken to be substantially rectangular or substantially elliptical) is as follows:

The length $g_V$ of the diffraction grating 20 in the direction vertical to the grooves 21 is a/cos ϕ. The length $g_P$ of the diffraction grating 20 in the direction parallel to the grooves 21 is a.

In addition to the above-mentioned conditions, conditions regarding the distance between adjacent focal points, that is, conditions regarding the interval s between the optical axes of the emission-side optical fibers 34a and 34b are given.

When f is the focal length of the collimating lens 12 and the focusing lenses 33, then the following condition is necessary:

$$s = f \cdot \Delta\psi.$$

Referring to FIG. 5, the conditions for minimizing the spectrometer 300 are explained in the following for the case that the collimating lens 12 is different from the focusing lens 33. The numerical aperture of the optical fiber 11 is taken to be NA, as in the above-described case, whereas the numerical aperture of the optical fibers 34a and 34b on the emission side is taken to be NA'. In this case, the collimating lens 12 is similar to the above-described case. The effective diameter of the collimating lens 12 is d, its focal length is f, and its physical diameter is D. The focusing lens 33 is different from the above-described case. The effective diameter of the focusing lens 33 is d', its focal length is f', and its physical diameter is D'.

First, the minimum value of the effective diameter d of the collimating lens 12 is the larger one of $9\lambda_0/(\pi\Delta\psi)$ and 3f·NA. The minimum value of the effective diameter d' of the focusing lens 33 is also the large value of $9\lambda_0/(\pi\Delta\psi)$ and 3f·NA. The focal length f' of the focusing lens 33 should be set to f(NA/NA').

Also, the minimum value of the size of the diffraction grating 20 (which is taken to be substantially rectangular or substantially elliptical) is as follows:

The length $g_V$ of the diffraction grating 20 in the direction vertical to the grooves 21 is a/cos ϕ. The length $g_P$ of the diffraction grating 20 in the direction parallel to the grooves 21 is a.

Moreover, the condition for the interval between adjacent focal points, that is, for the interval s between the optical axes of the emission-side optical fibers 34a and 34b, should be given as:

$$s = f' \cdot \Delta\psi.$$

The following is an explanation of the minimum values of the spectrometer 300 according to Embodiment 3 for the case that the light-incident portion 10 has an optical fiber 11a that is a multi-mode fiber. It should be noted that the numerical aperture of the optical fiber 11a serving as a planar light source is taken to be NA, and the focal length of the collimating lens 12 and the focusing lens 33, which have the same shape, is taken to be f. Also, the effective diameter of the collimating lens 12 and the focusing lens 33 is d, and their physical outer diameter is D.

Regarding the conditions for the minimum values of the spectrometer 300 of Embodiment 3, the conditions (a) and (b) can be determined in a similar manner to that described in Embodiment 2. More specifically, the following conditions are necessary.

First, the minimum value of the effective diameter d of the collimating lens 12 and the focusing lens 33 is 2f·NA.

The minimum value of the focal length f of the collimating lens 12 and the focusing lens 33 is $2w_1/\Delta\psi$.

The minimum value of the size of the diffraction grating 20 (which is taken to be substantially rectangular or substantially elliptical) is as follows: The length $g_V$ of the diffraction grating 20 in the direction vertical to the grooves 21 is 2f·NA/cos ϕ. The length $g_P$ of the diffraction grating 20 in the direction parallel to the grooves 21 is 2f·NA.

In addition to the above-mentioned conditions, conditions regarding the distance between adjacent focal points, that is, conditions regarding the interval s between the optical axes of the emission-side optical fibers 34a and 34b, are given.

When f is the focal length of the collimating lens 12 and the focusing lenses 33, then the following condition is necessary:

$$s = f \cdot \Delta \psi.$$

Referring to FIG. 5, the conditions for minimizing the spectrometer 300 are explained in the following for the case when the collimating lens 12 is different from the focusing lens 33. The numerical aperture of the optical fiber 11a is taken to be NA, as in the above-described case, whereas the numerical aperture of the optical fibers 34a and 34b on the emission side is taken to be NA'. In this case, the collimating lens 12 is similar to the above-described case. The effective diameter of the collimating lens 12 is d, its focal length is f, and its physical diameter is D. The focusing lens 33 is different from the above-described case. The effective diameter of the focusing lens 33 is d', its focal length is f, and its physical diameter is D'.

First, the minimum value of the effective diameter d of the collimating lens 12 is 2f·NA. Furthermore, the minimum value of the effective diameter d' of the focusing lens 33 is 2f·NA'.

Furthermore, the minimum value of the focal length f of the collimating lens 12 and the focusing lens 33 is $2w_1/\Delta\psi$. Furthermore, the focal length f' of the focusing lens 33 becomes f(NA/NA').

The minimum value of the size of the diffraction grating 20 (which is taken to be substantially rectangular or substantially elliptical) is as follows: The length $g_V$ of the diffraction grating 20 in the direction vertical to the grooves 21 is 2f·NA/cos φ. The length $g_P$ of the diffraction grating 20 in the direction parallel to the grooves 21 is 2f·NA.

Moreover, the condition for the interval between adjacent focal points, that is, for the interval s between the optical axes of the emission-side optical fibers 34a and 34b, should be given as:

$$s = f' \cdot \Delta \psi.$$

By satisfying the above conditions, the spectrometer 300 using the diffraction grating of Embodiment 3 is capable of wavelength separation with high efficiency and with little polarization dependency and can be minimized, when the adjacent wavelengths to be separated and the corresponding resolving power of the diffraction grating are given.

In order to hold the optical fibers 34a and 34b next to one another as in Embodiment 3, methods using ferrules for a plurality of optical fibers as well as methods of lining up the optical fibers 34a and 34b in an array of V-grooves are known and easily can be realized.

Graded index lenses were used for the collimating lens 12 and the focusing lenses 31a, 31b and 33 in Embodiments 1 to 3. Graded index lenses can be fabricated by ion-exchange of ordinary homogeneous glass rods. For this reason, small, high-performance lenses of less than 2 mm outer diameter can be mass-produced easily. Moreover, since these lenses are rod-shaped, they facilitate coupling with optical fibers and adjustment of the optical axis. Therefore, it is preferable to use such lenses as the collimating lens 12 and the focusing lenses 31a, 31b and 33.

It should be noted that it is also possible to use non-spherical lenses, spherical lenses or lens systems in which a plurality of spherical lenses made of homogeneous glass or plastic are combined, as the collimating lens 12 and the focusing lenses 31a, 31b and 33.

In optical terms as well as with regard to ease of production, it is preferable that the collimating lens 12 and the focusing lenses 31a, 31b and 33 of Embodiments 1 to 3 are of the same type and have the same shape and characteristics. However, as noted above, if each of the conditions is satisfied, then it is also possible to configure the spectrometers 100, 200 and 300 using different lenses for the collimating lens 12 and the focusing lens 31a, 31b and 33.

It should be noted that the spectrometers 100, 200 and 300 of Embodiments 1 to 3 spectrally separate the light beam 4 into two light beams 5 and 6, but the number of light beams into which the light beam 4 is separated also may be larger. When this is the case, if the intervals between the adjacent wavelengths to be separated are substantially constant, then the distance L and the optical axis interval s should be made uniform in accordance with the above-noted conditions for minimization. Thus, it is possible to set the spectrometers 100, 200 and 300 to the minimal size. If the intervals between the adjacent wavelengths are not constant, then the above-noted conditions for minimizing the spectrometers 100, 200 and 300 should be individually satisfied for each of the adjacent wavelengths. Thus, it is possible to minimize the size of the spectrometers 100, 200 and 300.

Figure 6A:
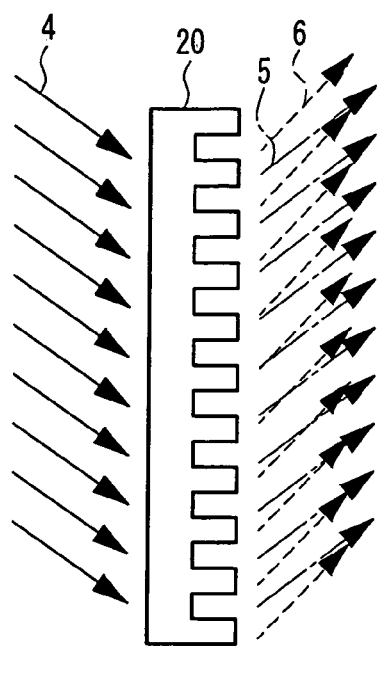
FIG. 6A is a cross-sectional view showing the configuration of a diffraction grating having a rectangular cross-sectional shape.
Figure 6B:
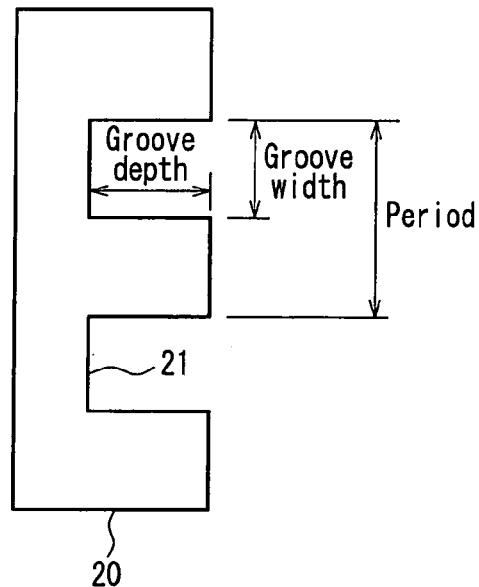
FIG. 6B is a magnified view of the diffraction grating in FIG. 6A.

FIG. 6A is a cross-sectional view showing the configuration of a diffraction grating having a rectangular cross-sectional shape, and FIG. 6B is a further magnified view of the diffraction grating in FIG. 6A. In Embodiments 1 to 3, a diffraction grating 20 is used whose cross-sectional shape of the grooves 21 is rectangular, as shown in FIG. 6A (referred to as "deep groove type" in the following). What is shown in FIG. 6A is a transmissive diffraction grating 20; when a collimated light beam 4 including two wavelengths is incident on the diffraction grating 20, then light beams 5 and 6 that are separated into different emission angles are emitted from the surface opposite to the incident surface.

The following is an explanation of the diffraction grating 20 used in Embodiments 1 to 3. It is generally known that when the groove depth, groove width and period of the diffraction grating 20 are as shown in FIG. 6B, then a diffraction efficiency that is theoretically close to 100% can be attained for a broad wavelength region, and differences in the efficiency due to the polarization direction (i.e. between TE polarized light and TM polarized light) virtually can be eliminated by optimizing the groove width and the aspect ratio (ratio between groove depth and groove width) (see Jiro Koyama, Hiroshi Nishihara, "Kouhadenshikougaku" (Lightwave Electronic Optics), Chapter 4, Korona, 1978).

The diffraction efficiency of the first-order light with a deep-groove type diffraction grating 20 was calculated with the following conditions, for example:

| | |
|---|---|
| Substrate material: | quartz (refractive index: 1.46) |
| Groove period $G_p$: | 1400 nm |
| Groove width $G_w$: | 530 nm |
| Groove depth $G_d$: | 3200 nm |

Incidence angle of light beam on diffraction grating 20: 31°

Figure 7:
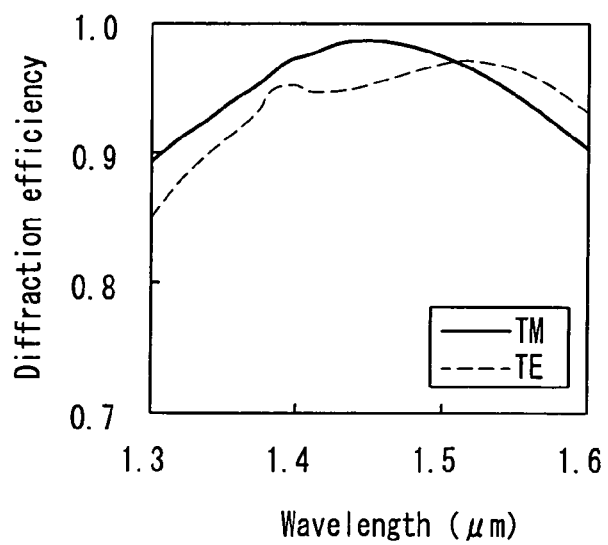
FIG. 7 is a graph showing the calculation result of the diffraction efficiency against the wavelength of the incident light beam.

For the calculation, a program (GSOLVER ver 4.20b by Grating Solver Development Company) based on RCWA (rigorous coupled wave analysis) was used. FIG. 7 shows the calculation result of the diffraction efficiency against the wavelength of the incident light beam.

From FIG. 7, it can be seen that a high diffraction efficiency of at least 89% is maintained for both TE polarized light, which is shown by a broken line, and TM polarized light, which is shown by a solid line, over a very broad wavelength region from 1300 nm (1.3 µm) to 1600 nm (1.6 µm).

Also the polarization dependent loss (PDL) was evaluated by calculation. PDL occurs due to a difference between the efficiency of TM polarized light and that of TE polarized light and can be expressed by the following expression:

PDL=10×log$_{10}$ (diffraction efficiency of TM polarized light/diffraction efficiency of TE polarized light)

Figure 8:
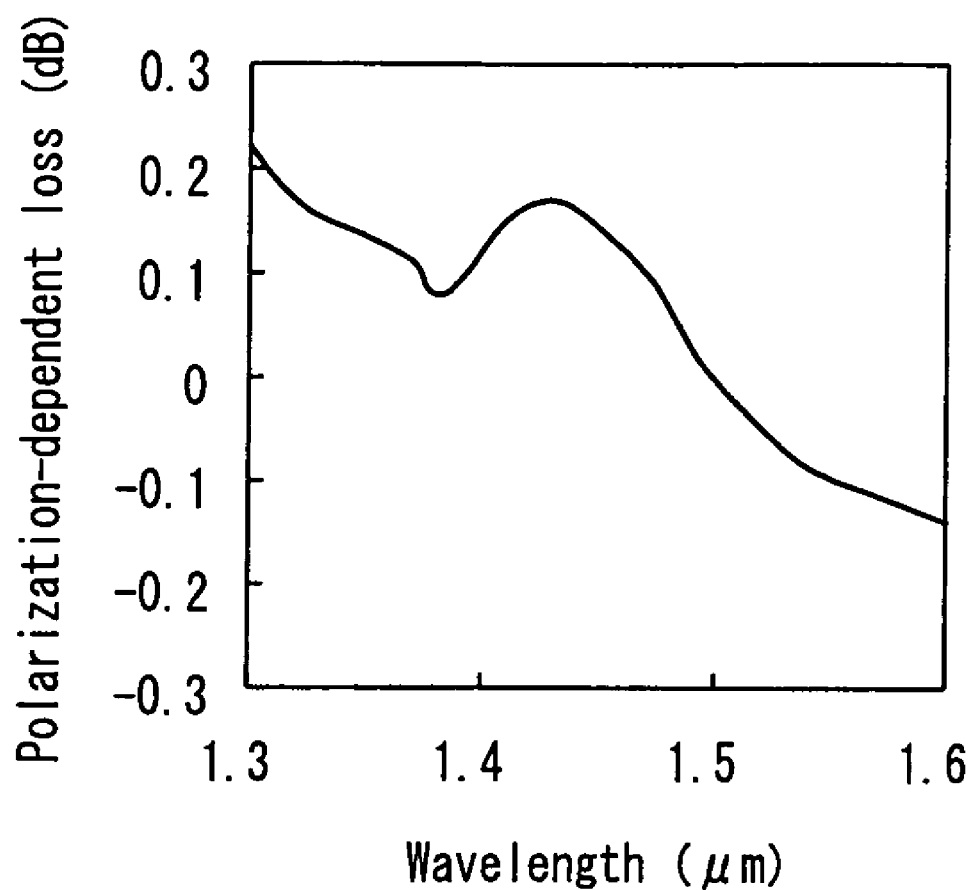
FIG. 8 is a graph showing the calculation results of PDL (polarization dependent loss) over the wavelength of the incident light beam.

FIG. 8 shows the calculation results of PDL over the wavelength of the incident light beam. From FIG. 8, it can be seen that the PDL is less than 0.23 dB over the wavelength region from 1300 nm (1.3 µm) to 1600 nm (1.6 µm).

Light that is guided by optical fibers assumes various polarization states that depend on the state of the optical fiber, and in practice, this polarization state is difficult to predict. For this reason, when spectrometers using diffraction gratings are applied to optical communication, then components controlling the polarization direction need to be added to the system, which leads to an increase in costs. However, by using a diffraction grating 20 of the deep groove type as in Embodiments 1 to 3, it is possible to suppress loss due to polarization, as shown in FIG. 8, which is very advantageous for system construction.

It should be noted that conventionally it has been difficult to machine rectangular grooves with a large aspect ratio, but due to recent advances in etching technology, it has become possible to fabricate grooves with higher precision. Furthermore, in Embodiments 1 to 3, a high diffraction efficiency is desirable, so that it is preferable to use a diffraction grating 20 of the deep groove type.

Moreover, by choosing a suitable substrate material for forming the diffraction grating 20, it is possible to alleviate the load due to machining a high aspect ratio. More specifically, by using a material with a high refractive index, it is possible to attain the same characteristics even when using a relatively low aspect ratio. Examples of materials with a high refractive index are silicon, metal oxides such as titanium oxide or tantalum oxide and silicon nitride.

Figure 9:
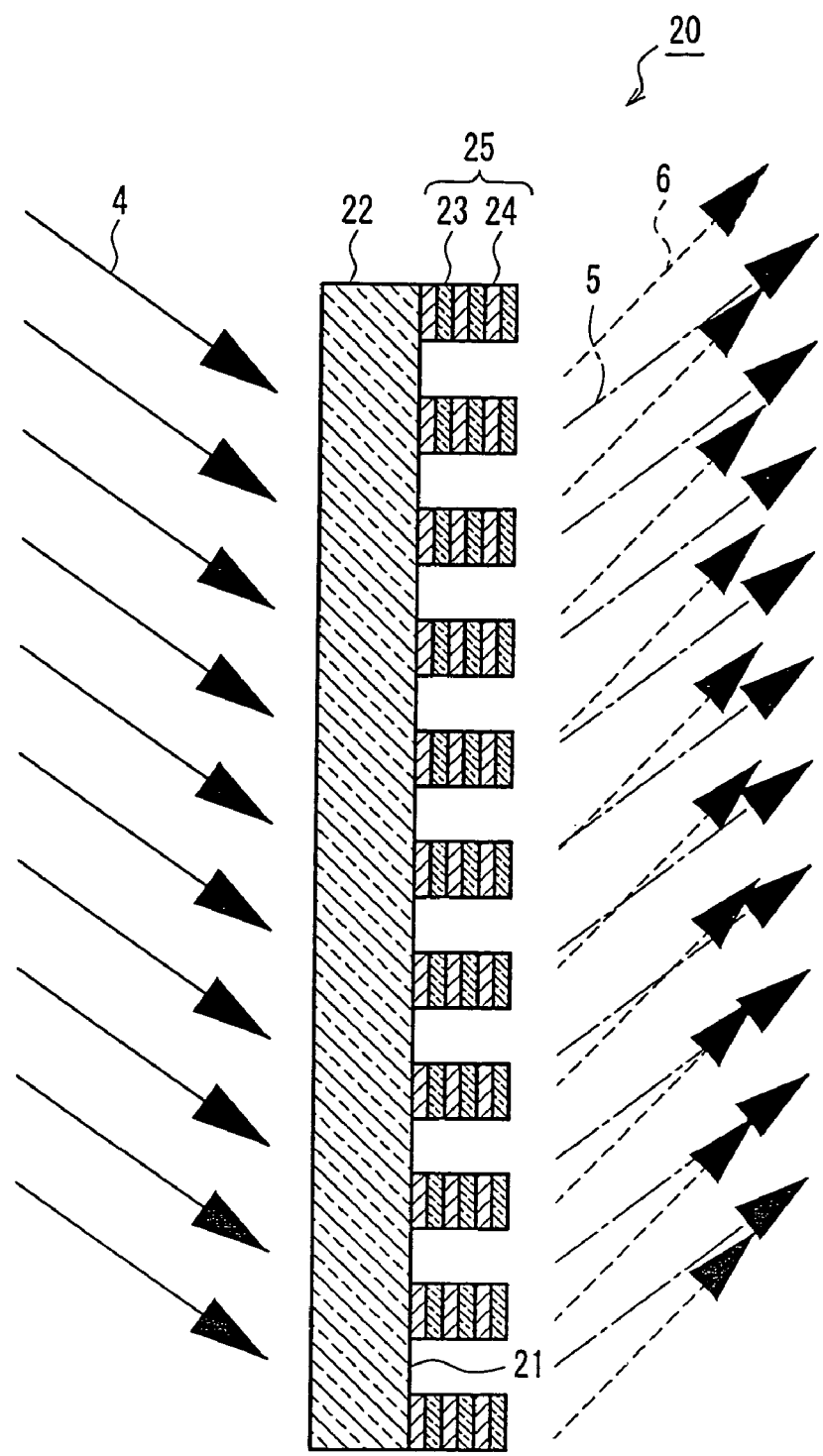
FIG. 9 is a cross-sectional view showing the configuration of a diffraction grating with a two-dimensional photonic crystal structure.

Furthermore, the diffraction grating 20 may also have a so-called two-dimensional photonic crystal structure. FIG. 9 is a cross-sectional view showing the configuration of a diffraction grating with a two-dimensional photonic crystal structure. More specifically, a diffraction grating 20 with two-dimensional photonic crystal structure can be fabricated by forming a periodically structured multi-layered film 25 by layering a first layer 23 and a second layer 24 alternately on a substrate 22 of the diffraction grating 20, and then subjecting the periodically structured multi-layered film 25 to etching to form grooves 21. Such a structure is also possible. Thus, it is possible to reduce the aspect ratio of the diffraction grating 20.

In any case, the material of the diffraction grating 20 should be selected as appropriate for the intended purpose. As long as transparency can be maintained in the used wavelength region of the light beam, there is no particular limitation regarding the material. However, in the case that high-energy radiation, such as pulsed waves from a UV laser, are used, then quartz, which can withstand high energies, is preferable. Moreover, if it is not used under harsh conditions, such as high-energy radiation, a material with a high refractive index may be used, and thus, the load of the machining process may be alleviated.

Referring to FIGS. 10A to 10D, the following is an explanation of a method for forming a deep-groove grating of the diffraction grating 20. Ordinarily, to machine the grooves, patterning by photolithography and gas-phase etching are used to form a deep-groove grating. FIGS. 10A to 10D are process diagrams showing a method for forming a deep-groove grating of the diffraction grating.

Figure 10A:
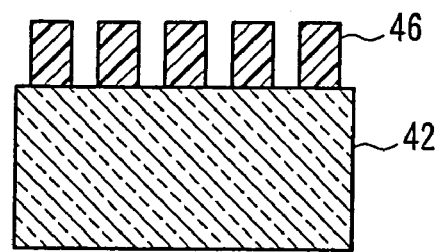
FIG. 10A is a process diagram illustrating a method for providing a diffraction grating with deep grooves.

After spin-coating photoresist 46 onto a quartz substrate 42, a line pattern of the desired period is formed by exposure (FIG. 10A).

The light source for this exposure naturally has a wavelength at which the photoresist 46 is photosensitive. For example, it is possible to use a mask exposure using UV light, such as a g-line or an i-line lamp, or direct drawing or mask exposure using a UV laser such as a He-Cd laser, or direct drawing using two-beam interference exposure or an electron beam. It is preferable to use these in consideration of costs and width of the pattern period.

Figure 10B:
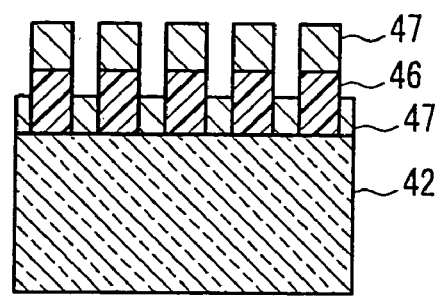
FIG. 10B is a process diagram illustrating a method for providing a diffraction grating with deep grooves.

Next, a metal film 47 is formed on the resist pattern (FIG. 10B). As the film forming method, it is possible to use sputtering or vacuum deposition, for example. Also, as the metal film 47, it is possible to use chromium or nickel, for example. In particular, if lift-off is used in the below-described step shown in FIG. 10C, then it is preferable to use vacuum deposition in view of scratches of the photoresist and improving the patterning precision.

Figure 10C:
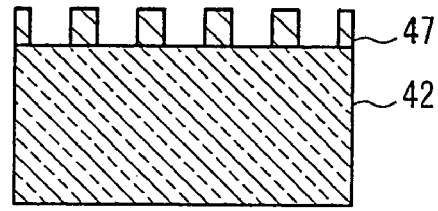
FIG. 10C is a process diagram illustrating a method for providing a diffraction grating with deep grooves.

A metal masking pattern is then formed by removing the unnecessary metal film 47 together with the photoresist 46 by lift-off after forming the metal film 47 (FIG. 10C). It is of course also possible to exchange the order of the step shown in FIG. 10A and the step shown in FIG. 10B, and to form a masking pattern by etching the metal film 47. However, studies of the inventors have shown that it is preferable to use a method using a thick-film metal mask formed by lift-off for machining with a high aspect ratio (the method in which the steps of FIG. 10A to FIG. 10D are performed in that order).

Figure 10D:
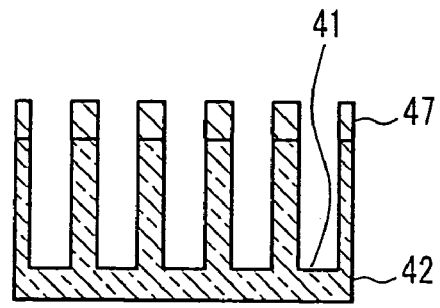
FIG. 10D is a process diagram illustrating a method for providing a diffraction grating with deep grooves.

Next, the formation of the vertical deep grooves 41 is performed using an ion etching device (FIG. 10D). The etching device should be selected as appropriate for the material to be etched, and for machining a large surface area with high efficiency, it is preferable to use reactive ion etching with a high-density plasma, such as an inductively coupled plasma (ICP) or magnetic neutral loop discharge (NLD). Finally, the mask of the remaining metal film 47 should be removed with a corrosive liquid or the like.

If the direction of the light rays is reversed, then the spectrometer according to the present invention also can be used as a multiplexing device for sending light of a plurality of wavelengths into a single optical fiber.

It should be noted that the spectrometer of Embodiments 1 to 3 can be used for wavelength-divisional multiplexing (WDM) communication in the field of telecommunication. Of these, in coarse wavelength division multiplexing (CWDM), which has the intervals between the multiplexed wavelengths and is introduced in metro networks, it is important to make components less costly. The spectrometers of Embodiments 1 to 3 can be made more compact and less costly, so that they are very advantageous for introduction into such systems.

On the other hand, in recent years, the development of recording devices striving for ever higher storage capacities, as in DVDs for example, has been advancing. Naturally, as the storage capacities become larger, faster recording and reading speeds are desired as well.

One example of how this issue is addressed is by simultaneous writing and reading with multiple wavelengths. In such systems, light including a plurality of multiplexed wavelengths is guided to an optical head, where the light is spectrally separated to perform writing or reading with a plurality of wavelengths, and the information is processed in parallel. In this case, it is essential that the head material is small, in view of the scanning over the disk, and it is advantageous to build the spectrometer 100, 200 or 300 of Embodiments 1 to 3 into such a system.

The wavelength region to which the spectrometer 100, 200 or 300 of Embodiments 1 to 3 can be applied is not particularly limited as long as the transmittance of the optical element can be ensured. However, for optical communication, it can be used in a wavelength region of 1000 to 1600 nm and for optical disks, it can be used in a wavelength region of 200 to 800 nm.

In each of the Embodiments 1 to 3, the light-incident portion 10 and the light-emitting portion 30 are configured by a combination of optical fibers (optical fiber 11 and 11a, emission-side optical fibers 32a, 32b, 34a and 34b) and lenses (collimating lens 12, focusing lenses 31a, 31b and 33). However, other configurations are also possible. For example, it is also possible to use a planar optical waveguide instead of an optical fiber. The light-incident portion 10 also may be configured so that the light from a multi-wavelength light source is used via a collimating lens. It is also possible to provide the light-emitting portion 2 with a light-receiving element as a monitor for measuring the light intensity for each wavelength.

The following is a more specific explanation of the present invention by way of working examples.

WORKING EXAMPLE 1

Figure 11:
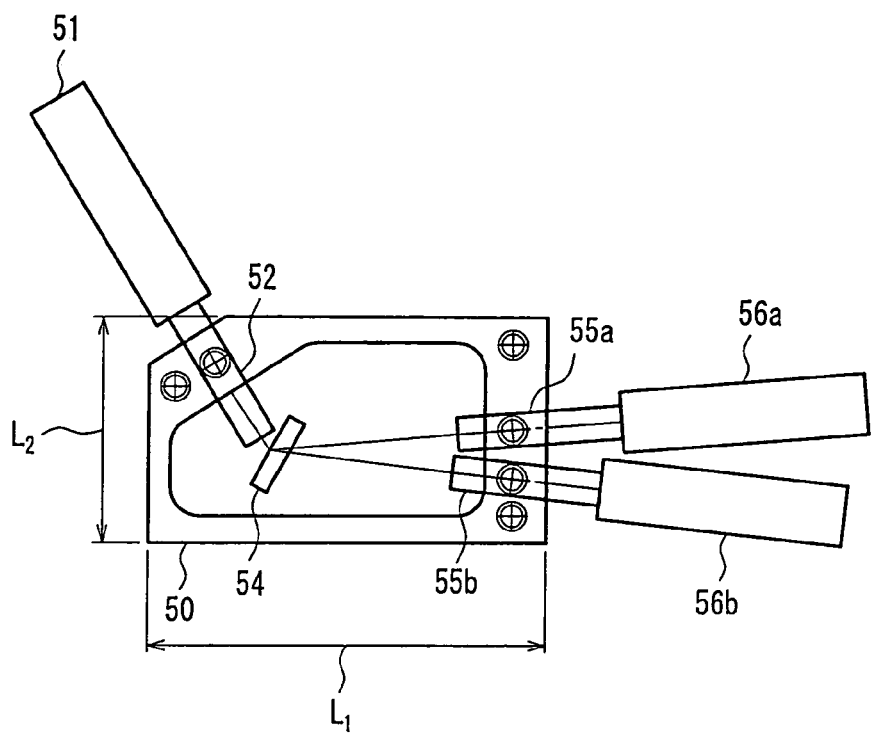
FIG. 11 is a schematic diagram showing the configuration of a spectrometer using a diffraction grating according to Working Example 1.

Referring to FIG. 11, Working Example 1 illustrates an example of the configuration of a spectrometer according to Embodiment 2. FIG. 11 is a schematic diagram showing the configuration of a spectrometer using a diffraction grating according to Working Example 1.

The incident-side optical fiber 51 and the emission-side optical fibers 56 are graded index type multimode optical fibers for the visible wavelength region (core diameter/cladding diameter=100/140 μm, NA=0.29, manufactured by Corning Inc.). The collimating lens 52 and the focusing lenses 55a and 55b are graded index type rod lenses (outer diameter: 1.8 mm, focal length: 1.84 mm) made by Nippon Sheet Glass Company, Limited. The collimating lens 52 is fixed to the front end of the incident-side optical fiber 51. Also, the focusing lenses 55a and 55b respectively are fixed to the front ends of the emission-side optical fibers 56a and 56b.

The outer side of the collimating lens 52 and the focusing lenses 55a and 55b is covered by a sheath made of stainless steel, so that their physical outer diameter D is 2.4 mm.

A diffraction grating 54 is made by etching deep grooves over a region with a surface area of 3×3 mm into one side of a synthetic quartz plate of 1 mm thickness, similar to the diffraction grating shown in FIG. 6A. That is to say, the dimensions of the diffraction grating 54, namely the groove period, the groove width and the groove depth, are as shown in FIG. 6B. The groove period of the diffraction grating 54 was set to 600 nm, its groove width $G_w$ was set to 330 nm, and its groove depth $G_d$ was set to 1100 nm.

Figure 12:
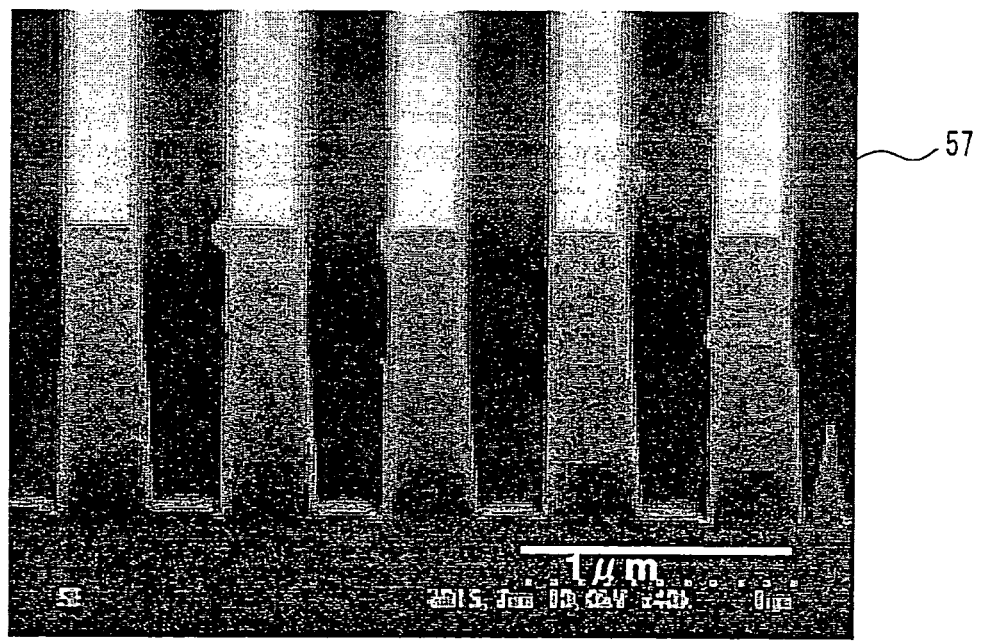
FIG. 12 is a photograph of a diffraction grating taken by SEM.
Figure 13A:
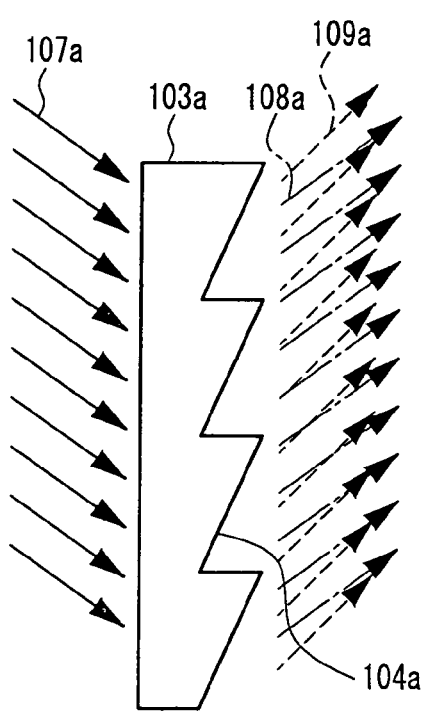
FIG. 13A is a cross-sectional view showing the configuration of a conventional transmissive diffraction grating having a blazed grating.
Figure 13B:
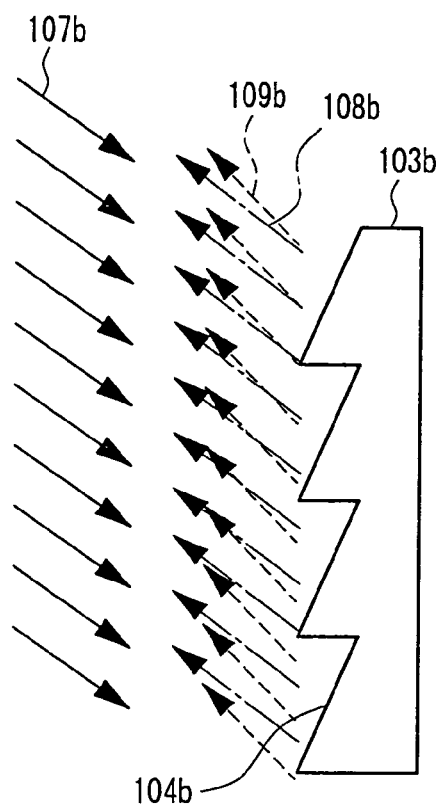
FIG. 13B is a cross-sectional view showing the configuration of a conventional reflective diffraction grating having a blazed grating.

The following is an explanation of the etching procedure: After spincoating an electron beam resist on a quartz substrate, a line pattern with a period of 600 nm was formed by electron beam drawing. The etching was performed to a depth of 1100 nm using reactive ion etching, after the resist pattern was transferred to a metal mask by the lift-off method. The cross-sectional shape of the thusly fabricated diffraction grating 54 was examined with a scanning electron microscope (SEM). FIG. 12 is a photograph of the diffraction grating 54 taken by SEM. As shown in FIG. 12, the grooves 57, which are shown dark, are lined up regularly one next to the other, and a structure is attained that is substantially as designed.

Semiconductor laser light with the wavelengths $\lambda_1$=635 nm and $\lambda_2$=532 nm was combined and sent into the incident-side optical fiber 51. The light beam from the collimating lens 52 was incident at an incidence angle of 29° on the diffraction grating 54, which was placed at a distance of 1.1 mm from the collimating lens 52. The outgoing angles of the first-order light from the diffraction grating 54 were 35.0° and 23.7° for the beams of the wavelengths $\lambda_1$ and $\lambda_2$, respectively.

The focusing lenses 55a and 55b were arranged on the emission side at a distance L=14 mm from the diffraction grating 54 to capture the light beams of the spectrally separated wavelengths, which were coupled into the optical fibers 56a and 56b. The distance between the focusing lenses 55a and 55b (optical axis distance) was set to 2.8 mm.

This optical system was enclosed in a case 50 made of metal. As shown in FIG. 11, the case 50 can be set to a size of $L_1$=30 mm and $L_2$=17 mm and is very compact.

The diffraction efficiency of the first-order light from the diffraction grating 54 in Working Example 1 was measured for different polarization directions of the incident light. The results of this measurement are shown in Table 1.

TABLE 1

| polarization direction | wavelength | |
| --- | --- | --- |
| | $\lambda_1$ | $\lambda_2$ |
| 0° (TE polarized) | 83% | 76% |
| 45° | 79% | 83% |
| 90° (TM polarized) | 74% | 89% |

As shown in Table 1, the diffraction efficiency of the first-order light is very high, and the polarization dependency is small.

WORKING EXAMPLE 2

In Working Example 1, a specific example of a spectrometer satisfying the conditions of Embodiment 2 was shown, but it is possible to make the collimating lens 52 and the focusing lenses 55a and 55b even smaller (see FIG. 11). Working Example 2 has the same configuration as Working Example 1, but it is a design example in which the incident-side optical fiber 51, the emission-side optical fibers 56a and 56b and the diffraction grating 54 are used, and the collimating lens 52 and the focusing lenses 55a and 55b are made as small as possible. The structure of the spectrometer of Working Example 2 is shown in FIG. 11, so that Working Example 2 is explained with reference to FIG. 11.

For the incident-side optical fiber 51 and the emission-side optical fibers 56a and 56b, multimode optical fibers with an NA of 0.29 and a core radius of $w_1$=0.05 mm were used. Moreover, the wavelengths of the two light beams to be separated were $\lambda_1$=635 nm and $\lambda_2$=532 nm (average wavelength $\lambda_0$=583.5 nm), and the angular difference of the diffraction angles was $\Delta\psi$=11.3°.

In this situation, with the conditions shown in Embodiment 2, the minimum value of the focal distance f of the collimating lens 52 and the focusing lenses 55a and 55b becomes $2w_1/\Delta\psi$=0.507 mm, and the minimum value of the effective diameter d of the collimating lens 52 and the focusing lenses 55a and 55b becomes 2f·NA=0.294 mm.

The minimally necessary size of the diffraction grating 54 is the length $g_V$ of the diffraction grating 54 along the direction perpendicular to the grooves and the length $g_P$ of the diffraction grating 54 along the direction parallel to the grooves, and for an incidence angle $\phi=29°$, these are $g_V=0.294/\cos\phi=0.336$ mm and $g_P=0.294$ mm. When the physical outer diameter D of the focusing lenses 55a and 55b is set to 0.3 mm, which is slightly larger than their effective diameter, then the distance L between the diffraction grating and the focusing lenses becomes $D/\Delta\psi=1.52$ mm.

WORKING EXAMPLE 3

Referring to FIG. 5, Working Example 3 illustrates a configuration example of a spectrometer according to Embodiment 3. In the spectrometer of Embodiment 3, a single-mode optical fiber with an NA of 0.1 was used for the optical fiber 11. The wavelengths of the light beams to be separated were $\lambda_1=1545$ nm and $\lambda_2=1555$ nm (average wavelength $\lambda_0=1550$ nm), and the angular difference of the diffraction angles was $\Delta\psi=0.60$.

The light-emitting portion 30 is one focusing lens 33, and the emission-side optical fibers 34a and 34b were lined up in close contact with an optical axis distance of s=125 μm.

In this case, the focal length f of the collimating lens 12 and the focusing lens 33 needs to be $s/\Delta\psi=11.94$ mm. The minimum value of the effective diameter d of the collimating lens 12 and the focusing lens 33 is the larger of $9\lambda_0/(\pi\Delta\psi)=0.424$ mm and 3f·NA=3.58 mm, so that it needs to be at least 3.58 mm.

The minimally necessary size of the diffraction grating 20 is the length $g_V$ of the diffraction grating 20 along the direction perpendicular to the grooves 21 and the length $g_P$ of the diffraction grating 20 along the direction parallel to the grooves 21, and for an incidence angle $\phi=45°$, these are $g_V=3.58/\cos\phi=5.06$ mm and $g_P=3.58$ mm.

Thus, using a collimating lens 12 and a focusing lens 33 with f=12 mm and d=3.6 mm, it is possible to configure a spectrometer with 16 channels, for example. In this case, the size of the diffraction grating 20 is 6×4 mm.

Thus, the spectrometers 100, 200 and 300 using a diffracting grating according to the Embodiments 1 to 3 can be made compact, and moreover can separate wavelengths with high efficiency and little polarization dependency.

INDUSTRIAL APPLICABILITY

A spectrometer using a diffracting element according to the present invention is compact, and can separate wavelengths with high efficiency and little polarization dependency, so that it can be used for communication systems or pickup devices for optical disks or the like.

The invention claimed is:

1. A spectrometer using a diffraction grating comprising:
a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a plurality of focusing lenses that respectively condense the light beams that have been spectrally separated by the diffraction grating;
wherein, when d is an effective diameter of the collimating lens and the focusing lenses, f is a focal length of the collimating lens and the focusing lenses, D is a physical outer diameter of the collimating lens and the focusing lenses, L is a distance between the diffraction grating and the focusing lenses, $\phi$ is an incident angle of the light beam with respect to the diffraction grating when the light beam is incident on the diffraction grating, NA is a numerical aperture of the incident-side optical waveguide, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and $\Delta\psi$ (in radian) is an angular difference of the diffraction angles at the diffraction grating between the light of the wavelength $\lambda_1$ and the light of the wavelength $\lambda_2$, then the following expressions are satisfied:

$$d \geq a$$

$$g_V \geq a/\cos\phi$$

$$g_P \geq a$$

$$L \geq D/\Delta\psi$$

where a is the larger value of $9\lambda_0/(\pi\Delta\psi)$ and 3f·NA.

2. A spectrometer using a diffraction grating comprising:
a light-incident portion including a planar light source having a uniform light intensity, and a collimating lens that converts a light beam having a plurality of wavelength components emitted from the planar light source into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a plurality of focusing lenses that respectively condense the light beams that have been spectrally separated by the diffraction grating;
wherein, when d is an effective diameter of the collimating lens and the focusing lenses, f is a focal length of the collimating lens and the focusing lenses, D is a physical outer diameter of the collimating lens and the focusing lenses, L is a distance between the diffraction grating and the focusing lenses, $\phi$ is an incident angle of the light beam with respect to the diffraction grating when the light beam is incident on the diffraction grating, $w_1$ is a radius of the planar light source, NA is a numerical aperture of the planar light source, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and $\Delta\psi$ (in radian) is an angular difference of the diffraction angles at the diffraction grating between the light of the wavelength $\lambda_1$ and the light of the wavelength $\lambda_2$, then the following expressions are satisfied:

$d \geq 2f \cdot NA$ $f \geq 2w_1/\Delta\psi$ $g_V \geq 2f \cdot NA/\cos\phi$ $g_P \geq 2f \cdot NA$ $L \geq D/\Delta\psi$.

3. A spectrometer using a diffraction grating comprising:
a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a single focusing lens that condenses the light beams that have been spectrally separated by the diffraction grating, and a plurality of emission-side optical waveguides that respectively transmit the light beams that have been condensed by the focusing lens;
wherein, when d is an effective diameter of the collimating lens and the focusing lens, f is a focal length of the collimating lens and the focusing lens, $\phi$ is an incident angle of the light beam with respect to the diffraction grating when the light beam is incident on the diffraction grating, NA is a numerical aperture of the incident-side optical waveguide, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and $\Delta\psi$ (in radian) is an angular difference of the diffraction angles at the diffraction grating between the light of the wavelength $\lambda_1$ and the light of the wavelength $\lambda_2$, then the following expressions are satisfied:

$d \geq a$ $g_V \geq a/\cos\phi$ $g_P \geq a$ $s = f \cdot \Delta\psi$ where a is the larger value of $9\lambda_0/(\pi\Delta\psi)$ and $3f \cdot NA$.

4. A spectrometer using a diffraction grating comprising:
a light-incident portion including a planar light source having a uniform light intensity, and a collimating lens that converts a light beam having a plurality of wavelength components emitted from the planar light source into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a single focusing lens that condenses the light beams that have been spectrally separated by the diffraction grating, and a plurality of emission-side optical waveguides that respectively transmit the light beams that have been condensed by the focusing lens;
wherein, when d is an effective diameter of the collimating lens and the focusing lens, f is a focal length of the collimating lens and the focusing lens, $\phi$ is an incident angle of the light beam with respect to the diffraction grating when the light beam is incident on the diffraction grating, $w_1$ is a radius of the planar light source, NA is a numerical aperture of the planar light source, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and $\Delta\psi$ (in radian) is an angular difference of the diffraction angles at the diffraction grating between the light of the wavelength $\lambda_1$ and the light of the wavelength $\lambda_2$, then the following expressions are satisfied:

$d \geq 2f \cdot NA$ $f \geq 2w_1/\Delta\psi$ $g_V \geq 2f \cdot NA/\cos\phi$ $g_P \geq 2f \cdot NA$ $s = f \cdot \Delta\psi$.

5. A spectrometer using a diffraction grating comprising:
a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a plurality of focusing lenses that respectively condense the light beams that have been spectrally separated by the diffraction grating, and emission-side optical waveguides on which the light that has been emitted from the focusing lenses is incident;
wherein, when d is an effective diameter of the collimating lens and d' is an effective diameter of the focusing lenses, f is a focal length of the collimating lens and f' is a focal length of the focusing lenses, D is a physical outer diameter of the collimating lens and D' is a physical outer diameter of the focusing lenses, L is a distance between the diffraction grating and the focusing lenses, φ is an incident angle of the light beam with respect to the diffraction grating when the light beam is incident on the diffraction grating, NA is a numerical aperture of the incident-side optical waveguide, NA' is a numerical aperture of the emission-side optical waveguide, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and Δψ (in radian) is an angular difference of the diffraction angles at the diffraction grating between the light of the wavelength $\lambda_1$ and the light of the wavelength $\lambda_2$, then the following expressions are satisfied:

$d \geq a$ $d' \geq a$ $g_V \geq a/\cos \phi$ $g_P \geq a$ $f' = f(NA/NA')$ $L \geq D'/\Delta\psi$ where a is the larger value of $9\lambda_0/(\pi\Delta\psi)$ and $3f \cdot NA$.

6. A spectrometer using a diffraction grating comprising:
a light-incident portion including a planar light source having a uniform light intensity, and a collimating lens that converts a light beam having a plurality of wavelength components emitted from the planar light source into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a plurality of focusing lenses that respectively condense the light beams that have been spectrally separated by the diffraction grating, and emission-side optical waveguides on which the light that has been emitted from the focusing lenses is incident;
wherein, when d is an effective diameter of the collimating lens and d' is an effective diameter of the focusing lenses, f is a focal length of the collimating lens and f' is a focal length of the focusing lenses, D is a physical outer diameter of the collimating lens and D' is a physical outer diameter of the focusing lenses, L is a distance between the diffraction grating and the focusing lenses, φ is an incident angle of the light beam with respect to the diffraction grating when the light beam is incident on the diffraction grating, $w_1$ is a radius of the planar light source, NA is a numerical aperture of the planar light source, NA' is a numerical aperture of the emission-side optical waveguide, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and Δψ (in radian) is an angular difference of the diffraction angles at the diffraction grating between the light of the wavelength $\lambda_1$ and the light of the wavelength $\lambda_2$, then the following expressions are satisfied:

$d \geq 2f \cdot NA$ $d' \geq 2f \cdot NA'$ $f \geq 2w_1/\Delta\psi$ $g_V \geq 2f \cdot NA/\cos \phi$ $g_P \geq 2f \cdot NA$ $f' = f(NA/NA')$ $L \geq D'/\Delta\psi$.

7. A spectrometer using a diffraction grating comprising:
a light-incident portion including an incident-side optical waveguide emitting a light beam that includes a plurality of wavelength components and that approximates a Gaussian beam, and a collimating lens that is arranged on an emission side of the incident-side optical waveguide and that converts the light beam approximating a Gaussian beam that is emitted from the incident-side optical waveguide into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a single focusing lens that condenses the light beams that have been spectrally separated by the diffraction grating, and a plurality of emission-side optical waveguides that respectively transmit the light beams that have been condensed by the focusing lens;
wherein, when d is an effective diameter of the collimating lens and d' is an effective diameter of the focusing lens, f is a focal length of the collimating lens and f' is a focal length of the focusing lens, φ is an incident angle of the light beam with respect to the diffraction grating when the light beam is incident on the diffraction grating, NA is a numerical aperture of the incident-side optical waveguide, NA' is a numerical aperture of the emission-side optical waveguide, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, $\lambda_0$ is an average wavelength of the adjacent incident light of the wavelengths $\lambda_1$ and $\lambda_2$, and Δψ (in radian) is an angular difference of the diffraction angles at the diffraction grating between the light of the wavelength $\lambda_1$ and the light of the wavelength $\lambda_2$, then the following expressions are satisfied:

$d \geq a$ $d' \geq a$ $g_V \geq a/\cos \phi$ $g_P \geq a$ $f' = f(NA/NA')$ $s = f' \cdot \Delta \psi$ where a is the larger value of $9\lambda_0/(\pi\Delta\psi)$ and $3f \cdot NA$.

8. A spectrometer using a diffraction grating comprising:
a light-incident portion including a planar light source having a uniform light intensity, and a collimating lens that converts a light beam having a plurality of wavelength components emitted from the planar light source into a substantially collimated light beam;
a diffraction grating having grooves on its surface, on which the light beam that has been converted into the substantially collimated light beam by the collimating lens is incident, the diffraction grating spectrally separating the light beam by emitting light beams whose emission direction depends on their wavelength; and
a light-emitting portion having a single focusing lens that condenses the light beams that have been spectrally separated by the diffraction grating, and a plurality of emission-side optical waveguides that respectively transmit the light beams that have been condensed by the focusing lens;
wherein, when d is an effective diameter of the collimating lens and d' is an effective diameter of the focusing lens, f is a focal length of the collimating lens and f' is a focal length of the focusing lens, $\phi$ is an incident angle of the light beam with respect to the diffraction grating when the light beam is incident on the diffraction grating, $w_1$ is a radius of the planar light source, NA is a numerical aperture of the planar light source, NA' is a numerical aperture of the emission-side optical waveguide, s is a distance between the adjacent emission-side optical waveguides, $g_V$ is a length of the diffraction grating along a direction perpendicular to the grooves, $g_P$ is a length of the diffraction grating along a direction parallel to the grooves, $\lambda_1$ and $\lambda_2$ are wavelengths of the adjacent incident light to be separated within the light beam incident on the diffraction grating, and $\Delta\psi$ (in radian) is an angular difference of the diffraction angles at the diffraction grating between the light of the wavelength $\lambda_1$ and the light of the wavelength $\lambda_2$, then the following expressions are satisfied:

$d \geq 2fp\ NA$ $d' \geq 2f'\ NA'$ $f \geq 2w_1/\Delta\psi$ $f' = f(NA/NA')$ $g_V \geq 2f \cdot NA/\cos \phi$ $g_P \geq 2f \cdot NA$ $s = f' \cdot \Delta\psi$.

9. The spectrometer according to claim 1, wherein the diffraction grating's surface on which the light beam is incident is substantially rectangular or substantially elliptical.

10. The spectrometer according to claim 1, wherein the collimating lens and the focusing lenses are rod lenses having a refractive index distribution along their radial direction.

11. The spectrometer according to claim 1, wherein the diffraction grating is a substrate having grooves of parallel relief in its surface, the groove's vertical cross-sectional shape being substantially rectangular.

12. The spectrometer according to claim 1, wherein the diffraction grating is a two-dimensional photonic crystal having grooves of parallel relief in its surface, the groove's vertical cross-sectional shape being substantially rectangular.

* * * * *